US011186895B2

(12) United States Patent
Werner et al.

(10) Patent No.: US 11,186,895 B2
(45) Date of Patent: Nov. 30, 2021

(54) CONTINUOUS SOLVENT EXTRACTION PROCESS FOR GENERATION OF HIGH GRADE RARE EARTH OXIDES FROM LEACHATES GENERATED FROM COAL SOURCES

(71) Applicant: University of Kentucky Research Foundation, Lexington, KY (US)

(72) Inventors: Joshua Michael Werner, Lexington, KY (US); Alind Chandra, Lexington, KY (US); Rick Q. Honaker, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 313 days.

(21) Appl. No.: 16/534,738

(22) Filed: Aug. 7, 2019

(65) Prior Publication Data
US 2020/0048737 A1 Feb. 13, 2020

Related U.S. Application Data

(60) Provisional application No. 62/752,633, filed on Oct. 30, 2018, provisional application No. 62/715,644, filed on Aug. 7, 2018.

(51) Int. Cl.
*C22B 59/00* (2006.01)
*C22B 3/44* (2006.01)

(52) U.S. Cl.
CPC .............. *C22B 59/00* (2013.01); *C22B 3/44* (2013.01)

(58) Field of Classification Search
CPC ..................................................... C22B 3/44

USPC ........................................................ 423/21.5
See application file for complete search history.

(56) References Cited

U.S. PATENT DOCUMENTS

| 4,988,487 | A | 1/1991 | Lai et al. |
| 5,639,433 | A | 6/1997 | Yuan et al. |
| 5,787,332 | A | 7/1998 | Black et al. |
| 6,110,433 | A | 8/2000 | Kleinsorgen et al. |
| 9,068,249 | B2 | 6/2015 | Sugita et al. |
| 9,174,855 | B2 | 11/2015 | Asnani et al. |
| 9,416,432 | B2 | 8/2016 | Park et al. |
| 9,752,212 | B2 | 9/2017 | Chen et al. |
| 9,783,870 | B2 | 10/2017 | Vaisanen et al. |
| 9,822,425 | B2 | 11/2017 | Bednarski et al. |
| 9,896,743 | B2 | 2/2018 | Genkin et al. |
| 2017/0260606 | A1 | 9/2017 | Kasaini |
| 2017/0356067 | A1* | 12/2017 | Peterson .................. C22B 7/02 |

(Continued)

FOREIGN PATENT DOCUMENTS

| AU | 2016203453 A1 | 12/2016 |
| CN | 85102248 A | 2/1987 |

(Continued)

OTHER PUBLICATIONS

English machine translation of CN85102248 Abstract.
English machine translation of KR20130001694 Abstract.
English machine translation of JPH08295512 Abstract.

*Primary Examiner* — Melissa S Swain
(74) *Attorney, Agent, or Firm* — Stites & Harbison PLLC; Warren D. Schickli

(57) ABSTRACT

A continuous solvent extract process is provided for concentrating rare earth elements from leachates generated from coal sources. The process involves solvent extraction which utilizes an organic extractant mixed into an organic solvent.

22 Claims, 19 Drawing Sheets

(56) References Cited

U.S. PATENT DOCUMENTS

2018/0265948 A1     9/2018  Laudal et al.
2019/0153562 A1 *   5/2019  Wang ..................... C01B 33/26

FOREIGN PATENT DOCUMENTS

| CN | 1807253 A * | 7/2006 |
| JP | H08295512 A | 11/1996 |
| KR | 20130001694 A | 3/2013 |
| RU | 2293134 C1 * | 2/2007 |
| WO | WO2016128621 A1 | 8/2016 |

* cited by examiner

CONTINUOUS SOLVENT EXTRACTION PROCESS FOR GENERATION OF HIGH GRADE RARE EARTH OXIDES FROM LEACHATES GENERATED FROM COAL SOURCES

RELATED APPLICATIONS

This application claims priority to U.S. Provisional Patent Application Ser. No. 62/715,644 filed on Aug. 7, 2018 and U.S. Provisional Patent Application Ser. No. 62/752,633 filed on Oct. 30, 2018, which are hereby incorporated by reference in their entirety.

GOVERNMENT SUPPORT

This invention was made with government support under Grant No. DE-FE-0027035 awarded by the Department of Energy. The government has certain rights in the invention.

TECHNICAL FIELD

This document relates generally to a new and improved continuous process or method for recovering rare earth elements from a coal source leachate in an effective and efficient manner.

BACKGROUND

Rare earth elements (REEs) and the alloys that contain them are useful in many electronic devices, including but not limited to, computer memory, cell phones, batteries, fluorescent lighting and the like. The seventeen REEs are cerium (Ce), dysprosium (Dy), erbium (Er), europeum (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y).

This document relates to a new and improved method for the effective and efficient recovery of REEs from any coal source leachate.

SUMMARY

In accordance with the purposes and benefits described herein, a new and improved method of recovering REEs from a coal source leachate may be described as comprising the steps of: (a) contacting, in a roughing circuit, REEs in the coal source leachate with a first organic solvent extraction phase to extract the REEs into an organic phase and leave a multiplicity of contaminants in an aqueous phase, (b) scrubbing, in the roughing circuit, additional contaminants, including elements which due to their concentration in the initial aqueous phase were loaded into the organic phase, from the organic phase, (c) stripping, in the roughing circuit, the REEs from the organic phase and (d) recovering the REEs in a REEs solution.

For purposes of this document, "coal source leachate" shall mean and include any aqueous based liquid containing rare earth elements derived from coal, coal byproducts, acid mine drainage, or produced as a result of mining activity. Further, it may include processes which intentionally enhance the recovery of rare earth elements, or natural causes incident to the mining process. Specific examples include, but are not limited to, leachate from the direct leaching of coal and coal byproducts and leachate naturally produced from coal sources due to pyrite oxidation, or from treatment of acid mine drainage from coal sources.

For purposes of this document, "roughing circuit" shall mean or refer to an initial solvent extraction circuit which has an organic phase that is recycled and is not in significant contact with further processing circuits save the transfer of aqueous solutions. The roughing circuit is adapted to maximize the recovery of REEs from the coal source leachate.

In one or more of the many possible embodiments, the method includes using an organic extractant, such as Di-(2-ethylhexyl) phosphoric acid (DEHPA), in the organic phase to provide preferential extraction of the REEs from the aqueous coal source leachate. Other organic extractants useful in the method include, but are not necessarily limited to 2-ethylhexyl phosphonic acid mono 2-ethylhexyl ester (PC-88A or HEHEPA), Cyanex 572, Cyanex 272 and Cyanex 923. Useful organic solvents include kerosene, SX Orfom™ solvent, Shellsol solvent and others known to those skilled in the art.

In one or more of the many possible embodiments, the method includes completing the contacting at an operating pH of between 0.5 and 3.5.

In one or more of the many possible embodiments, the method includes using a first acid or mild acid to selectively scrub the additional contaminants from the organic phase. For purposes of this document, "mild acid" means an acid of a type and pH which will remove contaminants but not substantially remove rare earth elements from the organic phase.

In one or more of the many possible embodiments, the method includes using a second acid or strong mineral acid to selectively strip the rare earth elements from the organic phase. For purposes of this document, "strong mineral acid" means an acid of a type and pH which will substantially remove rare earth elements from the organic phase. This reagent is typically, but not always, of a lower pH than that of the first or scrubbing acid.

In one or more of the many possible embodiments, the method includes cleaning the REEs in the rare earth element containing solution to upgrade purity of the REEs. In one or more of the many possible embodiments, cleaning includes subjecting the REEs in the rare earth element containing solution to additional contacting, scrubbing and stripping steps with an organic phase in a cleaning circuit separate from the roughing circuit.

For purposes of this document, "cleaning circuit" shall mean a circuit that receives a rare earth element containing aqueous solution from the roughing circuit. Such a cleaning circuit is adapted to maximize contaminant rejection. Thus, in one or more of the many possible embodiments, the method includes maximizing contaminant rejection and recycling unextracted REEs back to a leaching circuit upstream of the roughing circuit or a feed for the roughing circuit. In addition, the method may include subjecting a stripped solution from the cleaner circuit to oxalate precipitation after pH adjustment to a predetermined pH.

For purposes of this document, "leaching circuit" shall mean any process circuit that extracts rare earth elements from solids into aqueous solutions.

In other embodiments, cleaning includes incrementally raising the pH of an aqueous solution in which the REEs are held whereby different groups of contaminants are precipitated in different pH ranges. Further, cleaning may be performed in a selective precipitation circuit separate from the roughing circuit. Further, the method may include re-dissolving rare earth element hydroxides and precipitating as oxalates by adding calculated amounts of oxalic acid at a predetermined pH.

For purposes of this document, "precipitation circuit" shall mean a process where a combination of pH and reagent additions are used to manipulate the solubility of rare earth elements or contaminants to produce solid compounds.

One or more of the many possible embodiments may include subjecting the recovered REEs to oxalic precipitation by first bringing the pH of the rare earth element containing solution to a predetermined pH and then adding a calculated amount of oxalic acid to precipitate the REEs preferentially.

In one or more of the many possible embodiments, the method may include recovering scandium from the organic phase by saponification in a saponification circuit separate from the roughing circuit. This may be done following stripping. For purposes of this document, "saponification circuit" shall mean a process where the organic phase is contacted with a basic aqueous solution.

To assist the operation of the saponification, a wash with a third acid prior to organic phase treatment with alkali solutions may be employed to remove additional contaminants. As an example, iron may be removed selectively by washing prior to saponification to prevent iron precipitation and poor phase disengagement. The third acid may be, for example, sulfuric acid ($H_2SO_4$) and oxalic acid.

The method may also include treating the organic phase with an alkali solution causing the scandium to precipitate as scandium hydroxide and then filtering the scandium hydroxide from an aqueous solution. The method may also include the step of recycling the organic phase from the saponification circuit back to the roughing circuit. Still further, the method may include treating the aqueous solution with a fourth acid to exchange a saponification ion (e.g. Na+) with H+ prior to recycling back to the roughing circuit.

In one or more of the many possible embodiments, the method includes maintaining an aqueous to organic flow rate ratio (not including recycled solutions) in the roughing circuit of 1:1 to 1:100 at a pH of 0.5 to 3.5 and a concentration of organic extractant of between 0.5 and 10% and, more particularly 4% and 6%, in the organic solvent extraction phase. The method may also include adding a phase modifier to the organic phase to assist in saponification and improve selective recovery of the rare earth elements.

In one or more of the many possible embodiments, the method may include pretreating an aqueous feed to the roughing circuit with a reducing agent for reduction of ferric iron to ferrous iron. This serves to decrease contamination. Ascorbic acid may be used as the reducing agent. Other useful reducing agents include but are not limited to sulfur gasses, pyrite, copper, metallic iron and combinations thereof.

In the following description, there are shown and described several preferred embodiments of the method. As it should be realized, the method is capable of other, different embodiments and its several details are capable of modification in various, obvious aspects all without departing from the method as set forth and described in the following claims. Accordingly, the drawings and descriptions should be regarded as illustrative in nature rather than restrictive.

BRIEF DESCRIPTION OF THE DRAWING FIGURES

The accompanying drawing figures incorporated herein and forming a part of the specification, illustrate several aspects of the method and together with the description serve to explain certain principles thereof.

Figure 1:
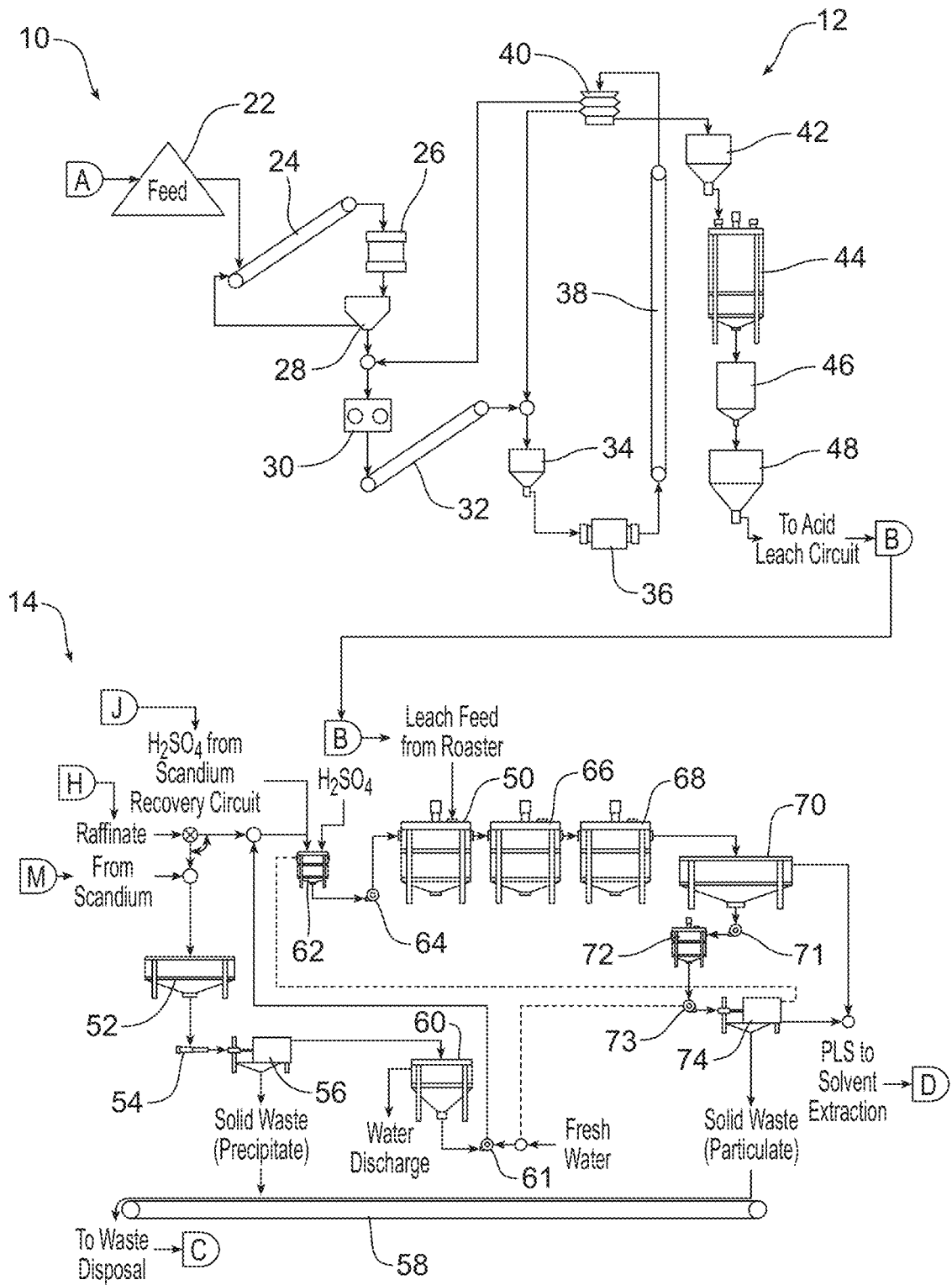
FIG. 1 is a schematic diagram of the coal source leachate preparation and roasting circuit and the acid leaching circuit.

Reference will now be made in detail to the present preferred embodiments of the method, examples of which are illustrated in the accompanying drawing figures.

DETAILED DESCRIPTION

Reference is now made to FIGS. 1-4 which are schematic illustrations of the system and method 10 for recovering rare earth elements (REEs) from a coal source leachate and, more particularly, an aqueous coal source leachate. That system and method 10 includes a preparation and roasting circuit 12 shown in FIG. 1, an acid leaching circuit 14 also shown in FIG. 1, a roughing circuit 16 shown in FIG. 2, a cleaning circuit 18 shown in FIG. 3 and a saponification circuit 20 shown in FIG. 4.

Coal source material is sized and roasted at the preparation and roasting circuit 12. More particularly, coal source material is fed from the stockpile 22 by the conveyor 24 into the jaw crusher 26 where it is crushed. The crushed coal source material is then fed to the vibrating screen 28 where coal source material of desired size is then passed into the roll crusher 30 for further processing. Material too large to pass through the vibrating screen is returned or recycled for further processing through the jaw crusher 26.

After roll crushing, the coal source material is fed by the mill conveyor 32 to the mill feed storage bin 34 for feeding into the ball mill 36. The coal source material processed in and then discharged from the ball mill 36 is conveyed by the bucket elevator 38 to the screen 40. Material passing through the screen 40 is then transferred to the roast feed storage bin 42 for feeding into the roaster 44. Coal source material too large to pass through the screen 40 is returned or recycled to the roll crusher 30 or the mill feed storage bin 34 for further milling.

After roasting, the coal source material is cooled in the cooler/chiller 46 and then stored in the leach feed storage bin 48 for subsequent processing in the acid leaching circuit 14.

The coal source material is fed from the leach feed storage bin 48 into the leach tank 50 where it is mixed with (a) raffinate from the roughing circuit 16 and (b) $H_2SO_4$ and waste water from the saponification circuit 20. The waste water from the saponification circuit 20 is held in the waste water treatment tank 52 before being pumped by the pump 54 to the waste water filter press 56 where solids are removed from the waste water and then those solids are delivered to the waste conveyor 58. The treated waste water is then held in the tank 60 until delivered by pump 61 with fresh water to the pH control tank 62. There the raffinate from the roughing circuit 16 and fresh $H_2SO_4$ may be added as necessary to reach the desired pH for leaching (for example, pH between 2 and 3.5). The pump 64 pumps the leaching solution from the pH control tank 62 into the leach tank 50 where it is mixed with the partially processed coal source material coming from the leach feed storage bin 48.

In the illustrated embodiment, the acid leaching circuit 14 includes three leach tanks 50, 66 and 68. More or less could be provided. The coal source material is subjected to acid leaching as it passes from leach tank 50 to leach tank 66 and then from leach tank 66 into leach tank 68. The coal source material then passes into the leach thickener 70. A pregnant leach solution (PLS) is then transferred to the roughing circuit 16 (see FIG. 2) for further processing while solid waste is collected from a feed delivered by the pump 71 to the leach filter feed tank 72 that is subsequently pumped by the pump 73 to the leach filter 74. The solid waste from the leach filter 74 is subsequently transferred to the waste conveyor 58 as illustrated.

The PLS from the acid leaching circuit 14 is delivered to the PLS storage and blending tank 76 where it is blended with the aqueous phase recycled from the loading stage of the cleaning circuit 18. The blended PLS solution is then transferred, serially through the reduction tank 78, the pH control tank 80 and the solvent extraction or SX buffer tank 82 before being delivered in the aqueous phase into the mixer and settler unit 84.

More particularly, a reducing agent (such as ascorbic acid) is mixed with the PLS in the reduction tank 78 in order to reduce iron contained in the PLS from its ferric state ($Fe^{3+}$) to its ferrous state ($Fe^{2+}$). This is done to decrease the iron loading into the organic phase. The PLS is brought to the desired operating pH in the pH control tank 80. The SX buffer tank merely acts as a holding tank to control the flow rate of the PLS through the downstream mixer and settler units. Three mixer and settler units 84, 86 and 88 make up the load stage 90 of the illustrated roughing circuit 16. It should be appreciated that substantially any number of mixer and settler units 84, 86 and 88 may be provided as desired or required for any particular application of the method.

Each mixer and settler unit 84, 86, 88 includes a mixing chamber 92, including an agitator 94 for mixing the organic and aqueous phases, and a settling chamber 96 for subsequent separation of the organic and aqueous phases. Here, it should be appreciated that the entire roughing circuit 16 is adapted to maximize the extraction of REEs into the organic phase from the aqueous phase for ultimate transfer to the cleaning circuit 18. Toward that end, the aqueous phases of the load stage 90, the scrubbing stage 104 and the stripping stage 122 of the roughing circuit 16 are all fully isolated from one another. Only the organic phase is passed between these stages.

As illustrated, the aqueous PLS from the SX buffer tank 82 is mixed with the organic phase recovered from the mixer and settler unit 86 by the agitator 94 in the mixing chamber 92. The mixed solution is then forced into the settling chamber 96 by the addition of more aqueous PLS and organic phase from the mixer and settler unit 86. As the mixed solution settles, the organic phase 98 and the aqueous phase 100 separate with the organic phase rising to the top. The REEs are collected in the organic phase 98 which is drawn off into the mixing chamber of the mixer and settler unit 102 of the scrubbing stage 104. Contaminants generally remain in the aqueous phase which is delivered to the mixing chamber of the mixer and settler unit 86 where the aqueous phase is mixed with the organic phase from the mixer and settler unit 88. This is done to extract additional REEs in the aqueous phase.

As indicated, the organic phase 106 with the collected REEs recovered from the mixer and settler 86 is delivered to the mixing chamber 92 of the mixer and settler unit 84. The aqueous phase 108 recovered from the mixer and settler unit 86 with the contaminants contained therein is delivered to the mixing chamber of the mixer and settler unit 88 where it is mixed with the organic phase from the saponification circuit 20 discussed in detail below. This is done once again to extract any remaining REEs in the aqueous phase and thereby ensure maximum collection of REEs from the source material.

As indicated above, the organic phase 110 with the collected REEs recovered from the mixer and settler 88 is delivered to the mixing chamber of the mixer and settler unit 86. The aqueous phase or raffinate 112 recovered from the mixer and settler unit 88 with the contaminants contained therein is passed through the coalescer 109 to recover additional organic phase from the aqueous solution and then delivered to the pH control tank 62 of the acid leaching circuit 14 as noted above.

The organic phase 98 delivered from the mixer and settler unit 84 to the mixing chamber of the mixer and settler unit 102 of the scrubbing stage 104 is mixed with an aqueous phase 116 that is recycled from the settling chamber of the mixer and settler unit 102 and isolated from other aqueous stages of the roughing circuit 16. Periodically some or all of that aqueous stage 116 is drawn off through the valve 113 and the coalescer 115 to the acid leaching circuit 14 and new dilute HCl or other appropriate mineral acid is added at 117 to maintain the desired operating pH in the mixer and settler unit 102. REEs are maintained in the organic phase 114 in the settling chamber of the mixer and settler unit 102 while a further or second group of contaminants are extracted from the organic phase 114 into the aqueous phase 116.

The organic phase 114 and the REEs contained therein are transferred from the mixer and settler unit 102 to the mixing chamber of the mixer and settler unit 118 where the organic phase is mixed with the aqueous phase 134 from the mixer and settler unit 120 passing through the valve 135 and any aqueous phase 128 recycled through the mixer and settler unit 118 by operation of the valve 119. Together, the mixer and settler units 118, 120 make up the stripping stage 122. While two mixer and settler units 118, 120 make up the stripping stage 122 of the illustrated embodiment, substantially any other number of such units may be utilized depending on the needs of any particular application.

During the stripping stage, REEs are stripped from the organic phase back into the aqueous phase. The separated organic phase 124 is delivered from the settling chamber of the mixer and settler unit 118 to the mixing chamber of the mixer and settler unit 120 while the aqueous phase 128 and collected REEs contained therein are delivered from the mixer and settler unit 118 by way of the coalescer 121 to the cleaning circuit 18.

The organic phase 124 delivered to the mixer and settler unit 120 is mixed in the mixing chamber with recycled aqueous phase 134 recovered from the settling chamber of the mixer and settler unit 120. HCl or other strong mineral acid may be added to the aqueous phase as shown at 130 to maintain the desired operating pH in the mixer and settler unit 120 of the stripping stage 122. The organic phase 132 recovered from the settling chamber of the mixer and settler unit 120 is delivered by the pumps 133 to the saponification circuit 20 which will be discussed in greater detail below.

Figure 3:
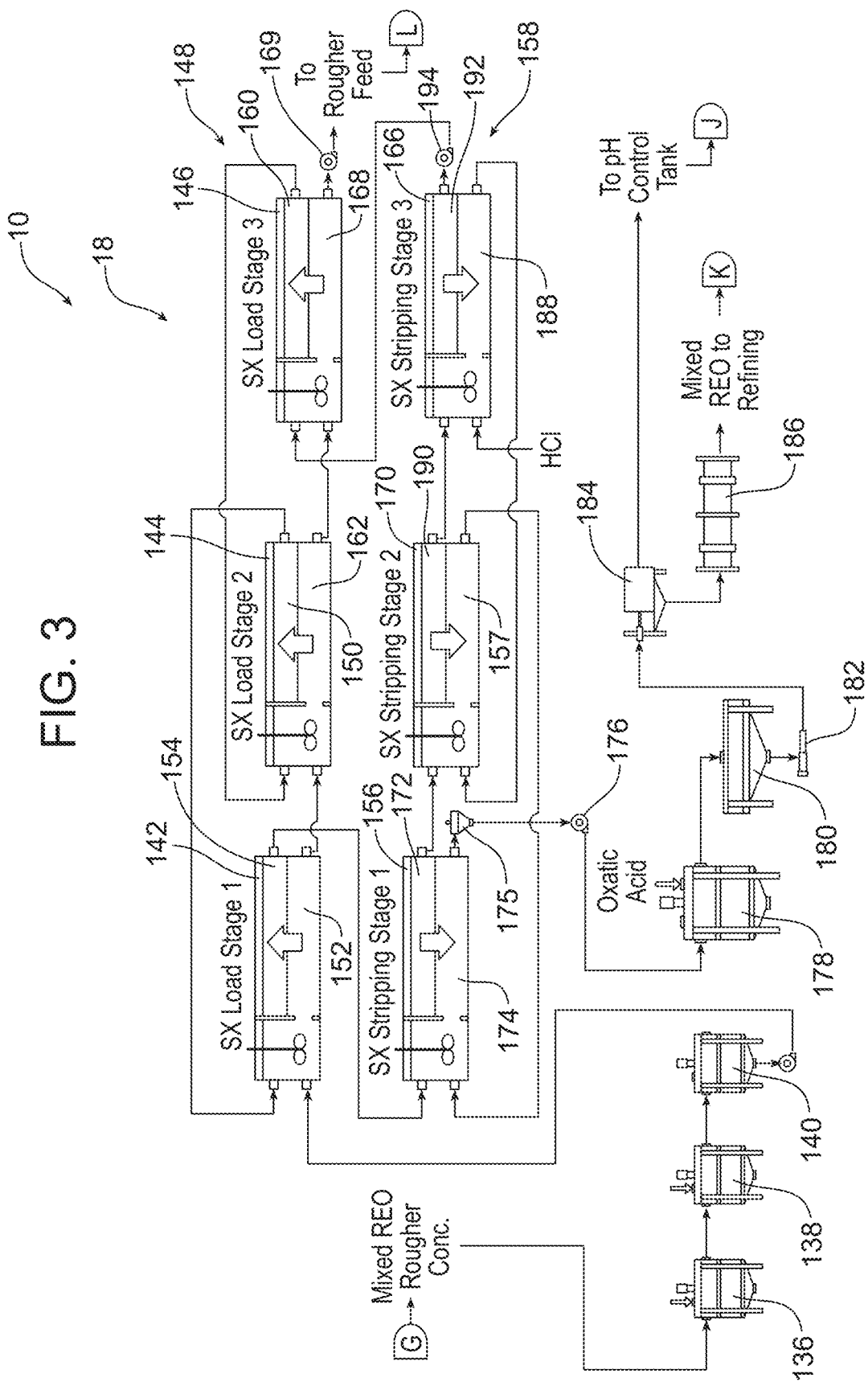
FIG. 3 is a schematic diagram of the cleaning circuit.

The aqueous phase with collected REEs 128 delivered from the mixer and settler unit 118 to the cleaning circuit 18 shown at FIG. 3 is transferred serially through the reduction tank 136, the pH control tank 138 and the SX buffer tank 140 before being delivered to the mixing chamber of the mixer and settler unit 142. More particularly, a reducing agent (such as ascorbic acid) is mixed with the solution in the reduction tank 136 in order to reduce iron contained in the solution from its ferric state (Fe3+) to its ferrous state (Fe2+). This is again done to decrease the iron loading into the organic phase. The solution is brought to the desired operating pH for cleaning in the pH control tank 138. The SX buffer tank 140 merely acts as a holding tank to control the flow speed of the solution through the downstream mixer and settler units 142, 144 and 146. Three mixer and settler units 142, 144 and 146 make up the load stage 148 of the illustrated cleaning circuit 18. It should be appreciated that substantially any number of mixer and settler units 142, 144 and 146 may be provided as desired or required for any particular application of the method.

The cleaning circuit 18 is adapted to maximize the removal of contaminants from the REEs. Toward this end, the aqueous phase of the load stage 148 is isolated from the aqueous phase of the stripping stage 158.

The aqueous solution delivered from the SX buffer tank 140 to the mixing chamber of the mixer and settler unit 142 is mixed with an organic phase 150 recovered from the mixer and settler unit 144. This is done to extract REEs from the aqueous phase 152 back into the organic phase 154 while contaminants are maintained in the aqueous phase. The organic phase and extracted REEs 154 are drawn off from the settling chamber of the mixer and settler unit 142 and delivered to the mixing chamber of the mixer and settler unit 156 of the stripping stage 158. In contrast, the aqueous phase 152 is delivered from the settling chamber of the mixer and settler unit 142 to the mixing chamber of the mixer and settler unit 144. There, the aqueous phase is mixed with the organic phase 160 recovered from the settling chamber of the mixer and settler unit 146 to further extract any REEs remaining in the aqueous phase into the organic phase.

As noted above, the organic phase and collected REEs 150 recovered from the settling chamber of the mixer and settler unit 144 is delivered to the mixing chamber of the mixer and settler unit 142. In contrast, the aqueous phase and contaminants 162 of the settling chamber of the mixer and settler unit 144 is delivered to the mixing chamber of the mixer and settler unit 146. There the aqueous phase is mixed with the organic phase recovered from the stripping stage 164 of the cleaning circuit and, more particularly, the organic phase recovered from the mixer and settler unit 166. This is done to further extract any REEs remaining in the aqueous phase to the organic phase while contaminants are once again maintained in the aqueous phase.

As noted above, the organic phase 160 recovered from the settling chamber of the mixer and settler 146 is delivered to the mixing chamber of the mixer and settler 144. In contrast, the aqueous phase 168 and any unextracted REEs recovered from the settling chamber of the mixer and settler 146 is delivered by the pump 169 to the storage and blend tank 76 of the roughing circuit 16.

The stripping stage 158 of the cleaning circuit 18 illustrated in FIG. 3 includes three mixer and settler units 156, 170 and 166. One or more such units may be provided depending on the needs of any particular application.

The organic phase and collected REEs 154 delivered to the mixing chamber of the mixer and settler unit 156 from the mixer and settler unit 146 is mixed with an aqueous phase 157 recovered from the settling chamber of the mixer and settler unit 170. As a result, the REEs are stripped from the organic phase 172 back into the aqueous phase 174. The aqueous phase and stripped/recovered REEs 174 are drawn from the settling chamber of the mixer and settler unit 156 through a coalescer 175 by a pump 176 and delivered to the oxalic acid addition tank 178 where oxalic acid is added. The solution is then transferred from the oxalic acid addition tank 178 to the precipitation and aging tank 180 where the REEs are precipitated as oxalates. The slurry is then transferred from the precipitation and aging tank 180 by the pump 182 to the filter press 184 where the precipitated REE oxalates are recovered. The recovered REE oxalates are then delivered to the roaster 186 to recover the final product of REE oxides for subsequent refining operations of a type known in the art which are beyond the subject matter of this document.

The organic phase 172 from the settling chamber of the mixer and settler unit 156 is delivered to the mixing chamber of the mixer and settler unit 170 where it is mixed with the aqueous phase 188 recovered from the settling chamber of the mixer and settler unit 166. This is done to extract any REEs remaining in the organic phase. As indicated above, the aqueous phase 157 recovered from the settling chamber of the mixer and settler unit 170 is delivered to the mixing chamber of the mixer and settler unit 156. In contrast, the organic phase 190 recovered from the settling chamber of the mixer and settler unit 170 is delivered to the mixing chamber of the mixer and settler unit 166.

There the organic phase is mixed with fresh strong mineral acid such as HCl to further extract any REEs remaining in the organic phase 192 into the aqueous phase 188. As noted above, the aqueous phase 188 recovered from the settling chamber of the mixer and settler unit 166 is returned to the mixing chamber of the mixer and settler unit 170 while the organic phase 192 recovered from the settling chamber of the mixer and settler unit 166 is recovered and delivered by the pump 194 to the mixer and settler unit 146 of the load stage 148.

Figure 2:
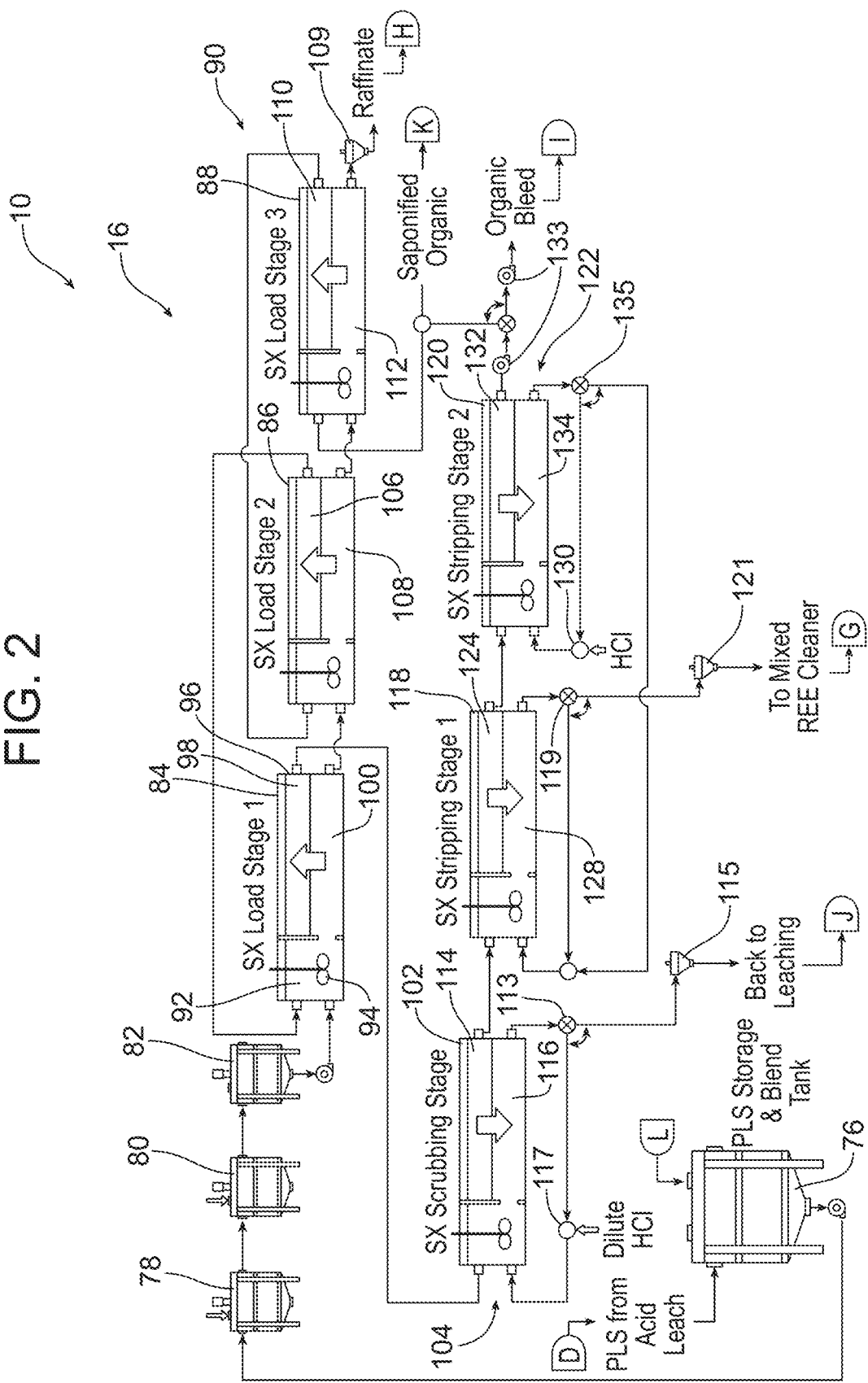
FIG. 2 is a schematic diagram of the roughing circuit.

It is also conceivable that the stripping stage 158 may be arranged so that the stripping acid may be recycled within each mixer and settler unit 156, 166 and 170 in a manner similar to that illustrated in FIG. 2 for the stripping stage 122 of the roughing circuit 16.

Scandium has a charge density much higher than other REEs. Accordingly, scandium exhibits significantly different behavior than other REEs and is not recovered well in the aqueous phase during the stripping procedure in the roughing circuit 16 described above. Thus, scandium is recovered separately by a saponification procedure.

Figure 4:
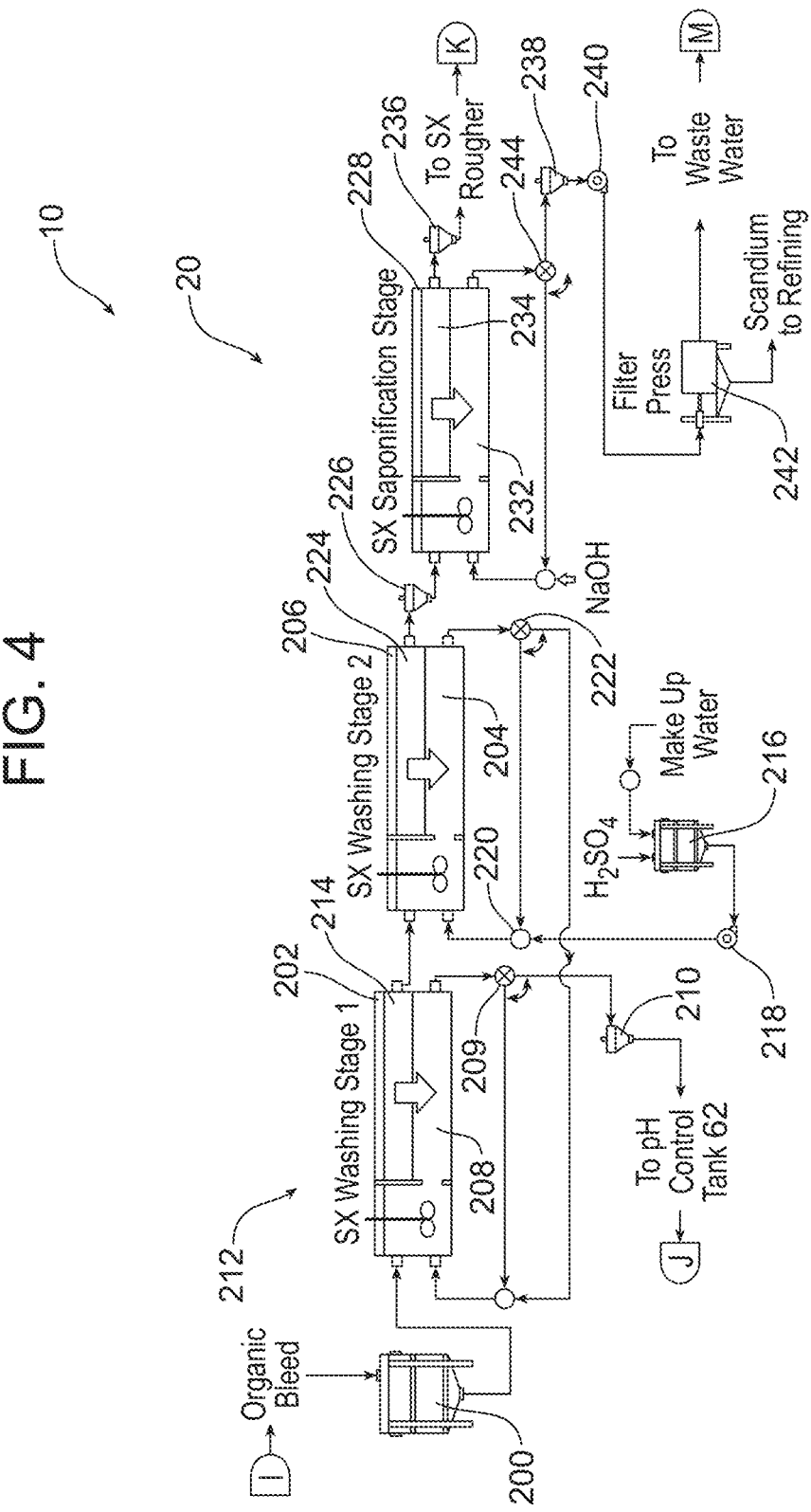
FIG. 4 is a schematic diagram of the saponification circuit.

FIG. 4 illustrates the saponification circuit 20 for the recovery of scandium. The organic phase 132 recovered from the settling chamber of the mixer and settler unit 120 includes the scandium that was not stripped from the organic phase by the stripping procedure. As previously indicated, the organic phase and the scandium contained therein 132 is delivered from the settling chamber of the mixer and settler unit 120 by the pumps 196 and 198 to the buffer tank 200 of the saponification circuit 20.

The organic phase with the scandium is then delivered from the buffer tank 200 at a desired flow rate to the mixing chamber of the mixer and settler unit 202 where it is mixed with the aqueous phase 204 from the settling chamber of the mixer and settler unit 206 and the aqueous phase 208 recycled from the settling chamber of the mixer and settler unit 202. This is done to further extract contaminants from the organic phase 214 into the aqueous phase 208 while maintaining the scandium in the organic phase. As shown, some of the aqueous phase 208 is delivered through the valve 209 to the coalescer 210 before being transferred to the pH control tank 62 of the acid leaching circuit 14. Together, the mixer and settler unit 202 and the mixer and settler unit 206 form the washing stage 212 of the saponification circuit 20. Note that the aqueous phase of the washing stage 212 is isolated from the aqueous phase of the saponification stage represented by the mixer and settler unit 228.

The organic phase and the scandium held therein 212 in the settling chamber of the mixer and settler unit 202 is delivered to the mixing chamber of the mixer and settler unit 206 where it is mixed with aqueous phase 204 recycled from the settling chamber of the mixer and settler unit 206 and the make-up water and $H_2SO_4$ delivered from the mixing tank 216 by the pump 218 through the junction 220. The valve 222 controls how much of the aqueous phase recovered from the settling chamber of the mixer and settler unit 206 is routed to the mixing chambers of the mixer and settler unit 202 and the mixer and settler unit 206.

The organic phase and the scandium contained therein 224 from the settling chamber of the mixer and settler unit 206 is recovered and passed through the coalescer 226 before being delivered to the mixing chamber of the mixer and settler unit 228 of the saponification stage 230 where it is mixed with sodium hydroxide (NaOH), or other appropriate base such as ammonium hydroxide, calcium hydroxide, magnesium hydroxide and potassium hydroxide, which functions to release scandium as scandium hydroxide into the aqueous phase 232 from the organic phase 234. As noted below in the experimental section, a phase modifier may be added to the organic phase used in the process to prevent the formation of an insoluble third phase during the saponification process that could otherwise form. Phase modifiers include but are not necessarily limited to tributyl phosphate (TBP), isodecanol, di-butyl butylphosphinate (DBBP), 2,2'-dibutoxy diethyl ether, other long chain alcohols (e.g. $C_{10+}$) and combinations thereof.

The organic phase 234 from the settling chamber of the mixer and settler unit 228 is recovered and passed through the coalescer 236 to the mixing chamber of the mixer and settler unit 88 of the load stage 90 of the roughing circuit 16 as described above. In contrast, the aqueous phase 232 from the settling chamber of the mixer and settler unit 228 is recovered and either recycled back to the mixing chamber of the mixer and settler unit 228 or passed through the coalescer 238 to the pump 240 for delivery to the filter press 242 by operation of the valve 244. The scandium hydroxide that precipitates out of solution and is captured by the filter press 242 is then recovered for further processing to scandium metal in a manner known in the art.

Figure 5:
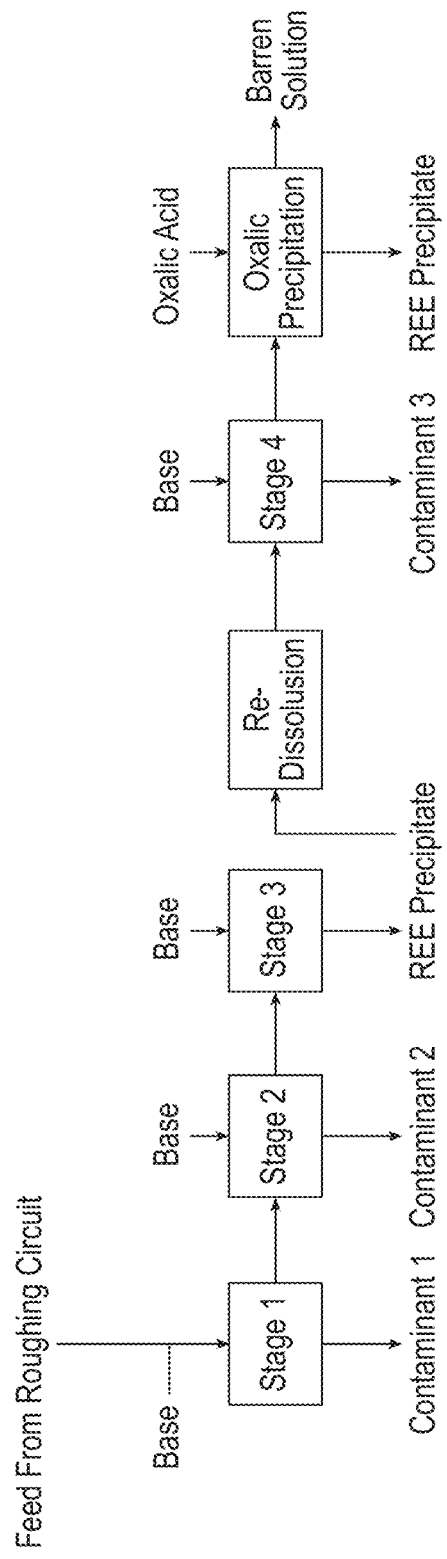
FIG. 5 is a schematic diagram of the precipitation circuit.

In some embodiments of the method, the roughing circuit 16 is followed by cleaning with a selective precipitation circuit such as schematically illustrated in FIG. 5. In such an embodiment, precipitation is used to further purify the aqueous solution from the roughing circuit 16. Toward this end, the feed, which may be treated prior to precipitation to adjust Eh and pH, is further manipulated by the addition of a base in the first stage. The addition of base raises the pH sufficiently to precipitate a contaminant. A multiplicity of stages may be used consisting of the mixing of liquid and base together with settling to remove contaminant precipitates. The rare earth elements are precipitated as the last stage of the initial precipitation sequence. This precipitate is then re-dissolved in a suitable acid and the process is repeated to remove additional contaminants. The final stage involves the addition of oxalic acid to produce a rare earth concentrate. An example of contaminant 1 may include iron. An example of contaminant 2 may include aluminum. An example of contaminant 3 may include magnesium. Those skilled in the art will be able to determine from experimentation and literature the appropriate pH ranges, number of stages and settings to implement such a circuit. For further details, please see U.S. patent application Ser. No. 16/185, 120, filed on Nov. 9, 2018, and entitled "LOW-COST SELECTIVE PRECIPITATION CIRCUIT FOR RECOVERY OF RARE EARTH ELEMENTS FROM ACID LEACHATE OF COAL WASTE", the full disclosure of which is incorporated herein by reference.

Summarizing, embodiments described herein generally include a roughing circuit 16 and a cleaning circuit 18. The roughing circuit 16 is comprised of an organic extractant which may include a diluent and possibly a phase modifier. The roughing circuit 16 is comprised of at least: loading phases for the recovery of rare earth elements from aqueous feed solutions into the organic phase, scrubbing phases which remove contaminant elements which have been loaded into the organic phase to an aqueous phase, and stripping phases which remove the desired elements from the organic phase into an aqueous phase. This is achieved by contacting the organic phase with various aqueous phases of requisite pH and acid type. The organic phase in the roughing circuit 16 is contained and recycled for reuse in the roughing circuit. The organic phase in the roughing circuit 16 does not contact or is not intentionally transferred to the cleaning circuit. Transfer of rare earth elements from the roughing circuit 16 to the cleaning circuit 18 is achieved by the transfer of the aqueous stripping phase.

An objective of the roughing circuit 16 in this method is to maximize the recovery of rare earth elements from the aqueous feed. Due to the nature of the extractant and operation, the roughing circuit 16 will simultaneously reject contaminants such as iron, aluminum, calcium and magnesium. In operation, parameters will be selected to balance the recovery of rare earth elements with that of the rejection of contaminants.

Due to the focus of the roughing circuit 16 on the recovery of rare earth elements a second or cleaner circuit 18 is needed to further reduce the level of contamination. There are several possible embodiments suitable for utilization as the cleaning circuit 18. These include, but are not limited to, solvent extraction, selective precipitation, and oxalic precipitation. As the roughing circuit 16 focuses on the recovery of rare earth elements with the added benefit of the rejection of contaminants, the cleaning circuit 18 is operated in such a manner that the rejection of contaminants is maximized. Aqueous streams from the cleaning circuit 18 containing rare earth elements may be fed back in to the process before or to the loading stage of the roughing circuit 16 to prevent loss of desired elements.

The benefits and advantages of a two-part circuit consisting of at least one roughing circuit 16 and one cleaning circuit 18 are many. These include the ability to utilize a separate organic for the roughing circuit 16 and another for the cleaning circuit 18 if solvent extraction is utilized for cleaning. By isolating the organic streams to roughing and cleaning the extractant types, dosages and additives may be different in the roughing and cleaning circuits 16, 18. Differences such as these will result in different organic properties, such as differences in selectivity to elements and differences in loading and unloading pH. This allows the circuits 16, 18 to be designed for differing objectives (roughing circuit for recovery, cleaning circuit for contaminant rejection).

The following tables illustrate some differences and key distinguishing parameters between the roughing circuit 16, cleaning circuit 18 and saponification circuit 20.

TABLE 1

Roughing Circuit

| Name of Stage | Acid Concentration | Typical Concentration | A:O ratio |
| --- | --- | --- | --- |
| Loading | 1.2M $H_2SO_4$ | 20 PPM | 1:1 |
| Scrubbing | 0.1M HCl | 0.5 PPM | 1:25 |
| Stripping | 6M HCl | 500 PPM | 1:25 |

TABLE 2

Cleaning Circuit

| Name of Stage | Acid Concentration | Typical Concentration | A:O ratio |
| --- | --- | --- | --- |
| Loading | 6M HCl (neutralized to pH 1) | 500 PPM | 1:1 |
| Scrubbing | N/A | N/A | N/A |
| Stripping | 6M HCl | 5000 PPM | 1:10 |

TABLE 3

Saponification Circuit

| Name of Stage | Acid Concentration | Typical Concentration | A:O ratio |
| --- | --- | --- | --- |
| Scrubbing | 1.2M $H_2SO_4$ | 0 PPM | 1:25 |
| Stripping | 2M NaOH | 0 PPM | 1:25 |

Experimental Results

A. Rare Earth Oxide Production

A final rare earth oxides (REO) product was produced from acid leachate generated from decarbonized middling coal from Beckley coal seam containing 89.7% REO by weight using a rougher solvent extraction (SX) circuit followed by a cleaner circuit.

The middling coal sample collected from Beckley coal processing plant was ground to size less than 10 micron using a batch attrition grinding mill. The coal sample was ground for 30 minutes at 10% solids by weight. The ground coal was floated in a column flotation cell for a residence time of 30 minutes using fuel oil #2 as a collector for coal and MIBC as a frothing agent. The coal tailings were dewatered using pressure filter and air dried in a heated oven. The dried solids were leached in a heated reactor at 75° C. for 2 hours using a 2M HCl solution with 20% solids by weight. The leachate was clarified by settling followed by vacuum filters. The pH of the clarified leachate was adjusted by careful addition of a 10M NaOH solution to prepare for the feed of the rougher SX circuit.

The operating pH of the rougher circuit feed was fixed at 1.9 with the aim of maximizing recovery of REEs. The REE recovery obtained at 1.9 pH was 99.56% and the recoveries for the contaminants were 9.38% for aluminum, 4.45% for calcium, 18.46% for iron and 6.69% for magnesium. The loaded organic was scrubbed using 0.1M HCl and the REEs were scrubbed using a solution of 6M HCl. The pH of the resulting stripped solution was adjusted using a 10 M NaOH solution to 1.48 which was the operating pH of the cleaner circuit.

In this embodiment a cleaner circuit utilizing SX was operated at a feed pH of 1.48 with the aim of rejecting most of the contaminants. The REE recovery obtained at 1.48 pH was 82.46% and the recoveries for the contaminants were 4.7% for aluminum, 4.24% for calcium, 15.46% for iron and 1.06% for magnesium. The loss of recovery (17.54%) is recycled to the source/rougher loading stage. The pH of the resulting REE strip solution was adjusted by adding 10M NaOH dropwise to 1.070 which is the optimum pH for oxalate precipitation.

Figure 6:
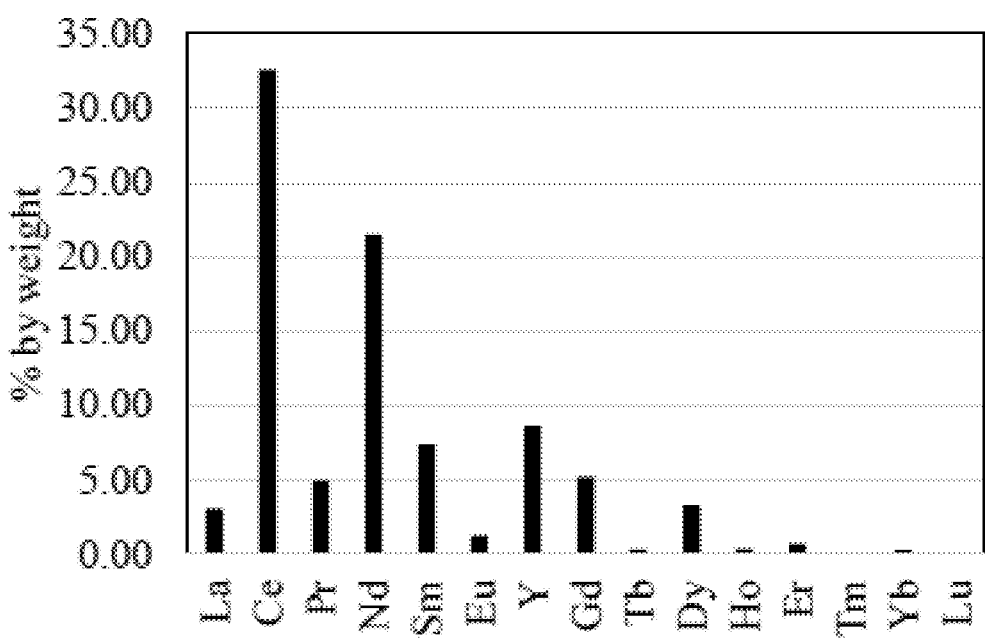
FIG. 6 is a graphical representation of rare earth element distribution of the final precipitated and roasted product from roughing and cleaning from selective precipitation.

A saturated solution of oxalic acid (1.77 M) was added to the stripped stream and aged for 30 min for the REEs to precipitate in the form of oxalates. The precipitates were separated from the solution using a high-speed centrifuge. The REE oxalates were subsequently roasted at 750° C. to produce the final product of REO. The REO was analyzed using inductively coupled plasma-optical emission spectroscopy (ICP-OES) and the grade of the product was ascertained to be 89.7% by weight. FIG. 6 shows the REE analysis obtained by oxalic precipitation and roasting.

Figure 7:
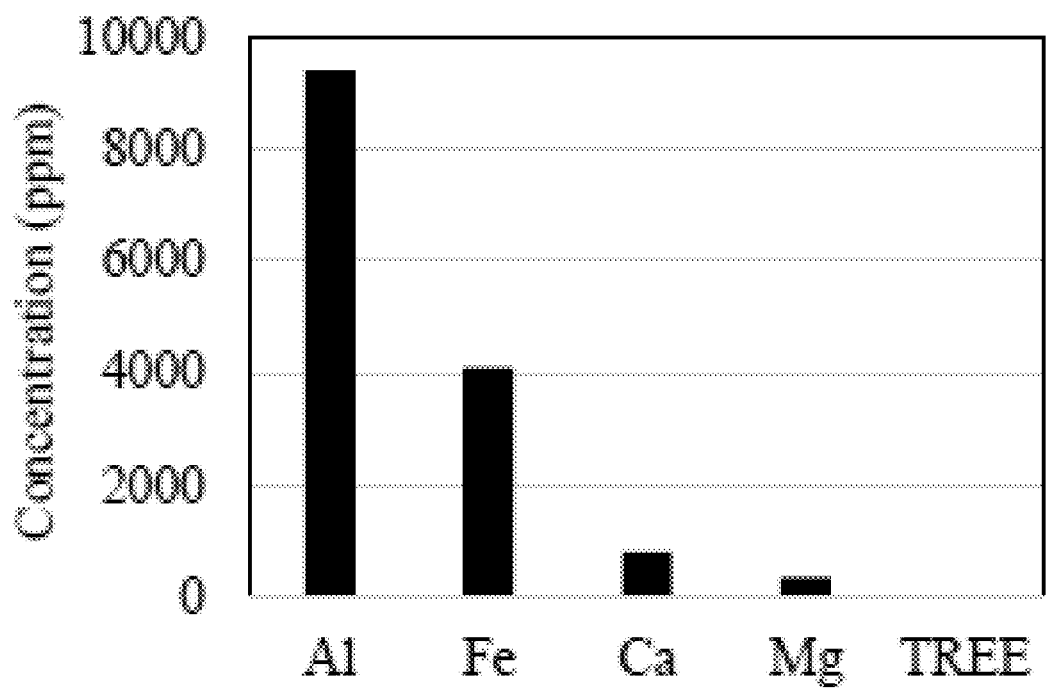
FIG. 7 is a graphical representation of the concentration of contaminants and total REEs (TREE) in the solvent extraction feed following the step of contacting the REEs with the organic solvent extraction diluent in the roughing circuit.
Figure 8:
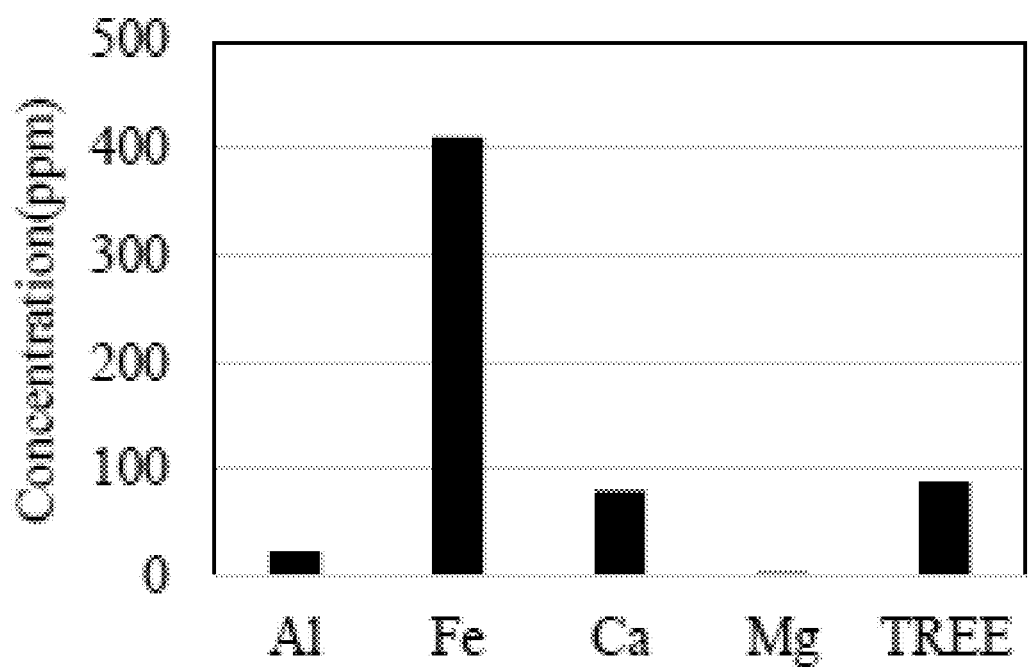
FIG. 8 is a graphic representation of the concentration of contaminants and total REEs in the stripped solution following the steps of scrubbing the second group of contaminants from the organic phase and stripping the REEs from the organic phase in the roughing circuit.
Figure 9:
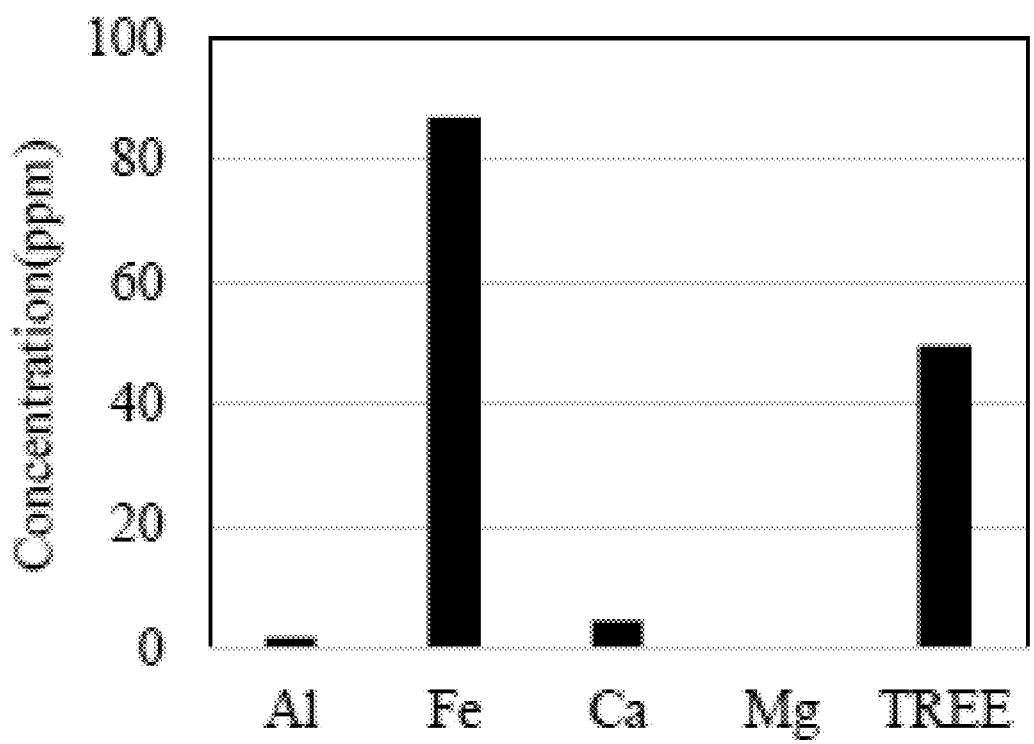
FIG. 9 is a graphical representation of the concentration of the contaminants and the TREE in the stripped solution obtained from the cleaner circuit.

The relative concentration ratio of total REEs (TREEs) with respect to contaminants increased from 0.002 in the feed leach solution to 0.171 in the rougher stripped solution and to 0.531 in the cleaner stage stripped solution. In this feed source, a high ratio of TREEs with respect to contaminants was reached using one cleaner circuit, which was enough to be treated with oxalate precipitation process. FIGS. 7-9 show the major contamination levels for the SX rougher feed, roughing strip solution and cleaner stripped solution.

B. Effects of Extractant Dosage

The effect of extractant dosage was studied on a test solution prepared from sulfate salts of iron, aluminum, calcium and lanthanum. Lanthanum was selected as the representative element for the total rare earth elements as it is the lightest REE and has the lowest distribution coefficient.

The reaction mechanism of the metal extraction in a cation exchange extractant is given as:

$$M^{3+} + 3H_2A_2 = M(HA_2)_3 + 3H^+$$

The equilibrium constant of the reaction is given by:

$$K_e = \frac{[MA_3]^3[H^+]}{[M^{3+}][HA]^3}$$

As the reaction constant is dependent on the inverse of third power of the H+ concentration in the aqueous phase, the % metal extracted in the organic is also influenced by the H+ concentration or the pH of the solution. As the pH is increased, the % metal extracted also increases. The reaction is also directly dependent on the third power of the concentration of extractant in the organic phase. This dependency is true for REE as well as other major contaminants present in the solution. Therefore, there exists an optimum initial pH and extractant concentration for which highest selectivity between the REEs and contaminants can be achieved. To study the effect of extractant in the diluent four different organic solutions were prepared with 5,10, 15 and 20% v/v DEHPA in kerosene. The pH of test solution was adjusted to different values by adding 10 M NaOH solution dropwise. 50 mL of test solution was mixed with 50 mL of organic solution in Erlenmeyer flask in the orbital shaker at 400 RPM for 15 minutes. The phases were disengaged in a separatory funnel and aqueous phase was analyzed as described above. The % extraction was calculated in the same way as described by the equation:

$$\% \text{ Extraction} = \frac{[M]_{Feed} - [M]_{Raffinate}}{[M]_{Feed}}$$

Figure 10:
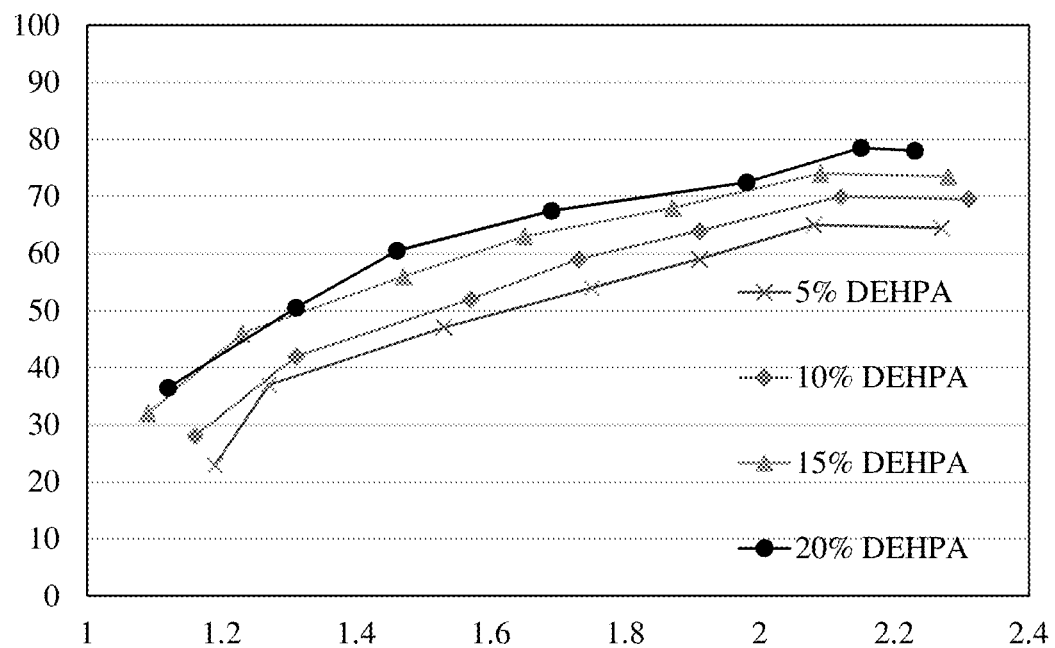
FIG. 10 is a graphical representation of the loading behavior of lanthanum with different % DEHPA solutions.

The % extraction of lanthanum which was used as a representative element with different initial pH(1.1-2.2) is shown in FIG. 10 for different concentration of DEHPA in kerosene(5%, 10%, 15% and 20%). Extraction was not tested at higher pH than 2.2 as higher pH caused a phase disengagement problem due to high loading in the organic phase. The % extraction increases with increase in the initial pH of the solution for each organic solution. Additionally, the % extraction increased with the increase in the DEHPA concentration in the organic phase. The maximum % extraction of lanthanum which was measured at a single contact was 78% at pH 2.2 with 20% DEHPA in kerosene.

Figure 11:
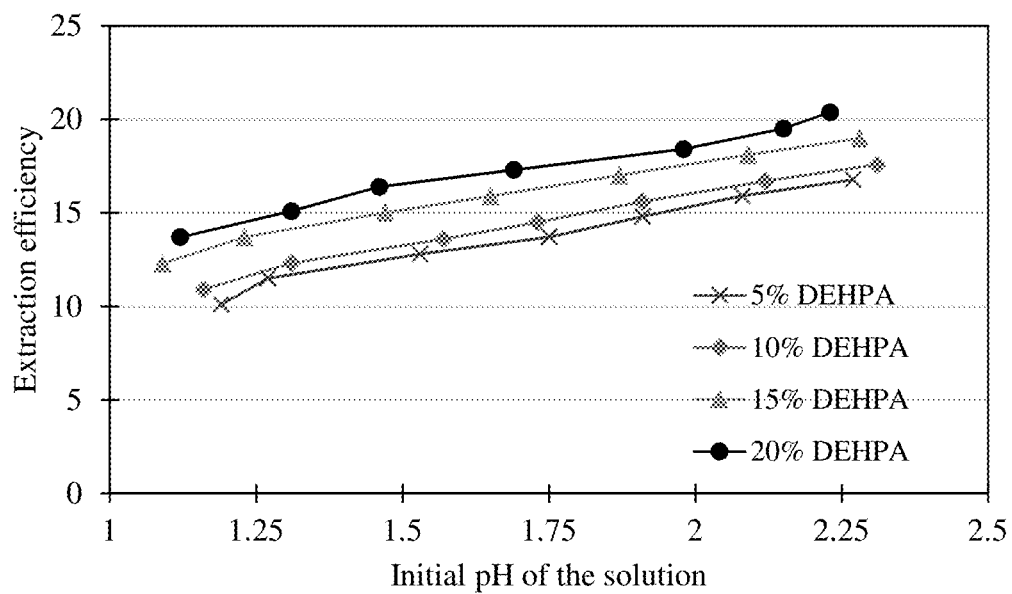
FIG. 11 is a graphical representation of the loading behavior of iron with different % DEHPA solutions.

However, the % extraction of the major contaminants also increased with the increase in the pH of the solution. The iron extraction increased from 10.1% to 16.8% when the pH was increased from pH 1.1 to 2.2 for 5% DEHPA solution. The increase in the extraction of iron was less pronounced than the increase in the % extraction of lanthanum. However, as the iron was present in much larger concentration in the test solution, the absolute amount of iron co-extracted increased with incremental increase in the pH. The % extraction of iron also increased with the increase in concentration of DEHPA in the organic phase. This is shown in FIG. 11.

Figure 12:
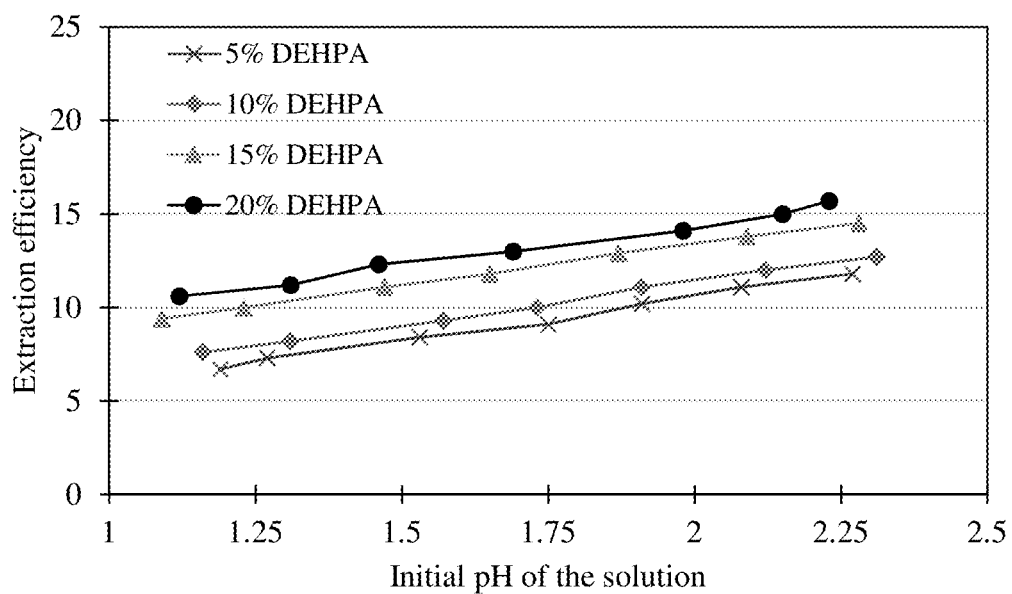
FIG. 12 is a graphical representation of the loading behavior of aluminum with different % DEHPA solutions.

A similar trend was also observed for aluminum, the % extraction for which increased from 6.7 to 11.8% when the pH was increased from 1.1 to 2.2 for 5% DEHPA solution. Similar to iron, the % extraction of aluminum also increased with concentration of DEHPA in the organic phase. This is shown in FIG. 12.

Figure 13:
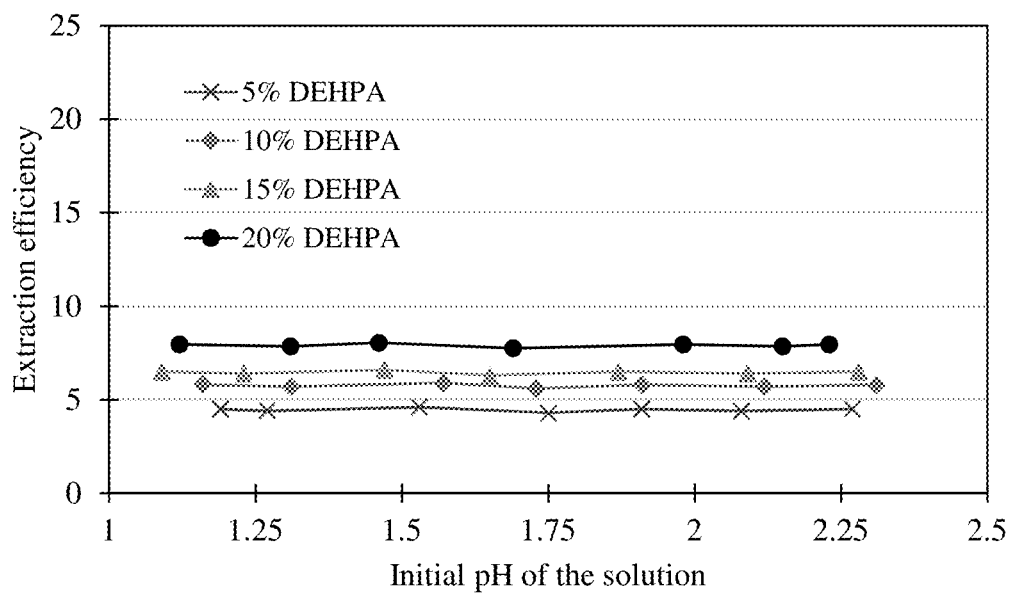
FIG. 13 is a graphical representation of the loading behavior of calcium with different % DEHPA solutions.

The co-extraction of calcium was observed to be largely independent of initial pH of the solution. However, with the increase in DEHPA concentration of the organic phase, the % extraction of calcium increased significantly from 4.5% to 7.95%. This is shown in FIG. 13.

Another goal of the study of the extractant concentration was to identify the optimal condition for which the selectivity for REEs is highest with respect to contaminants. The separation of REEs is generally evaluated based on the ratio of distribution coefficients or the selectivity factor. However, in the coal based leachate system, the concentration of contaminants is orders of magnitude higher than the concentration of TREEs. Therefore, the selectivity of the process was evaluated on the basis of decontamination ratio, defined as the ratio of relative concentration of contaminants in feed and product.

$$DF = \frac{([Contaminants]_{feed})/([REE]_{feed})}{([Contaminants]_{product})/([REE]_{product})}$$

Figure 14:
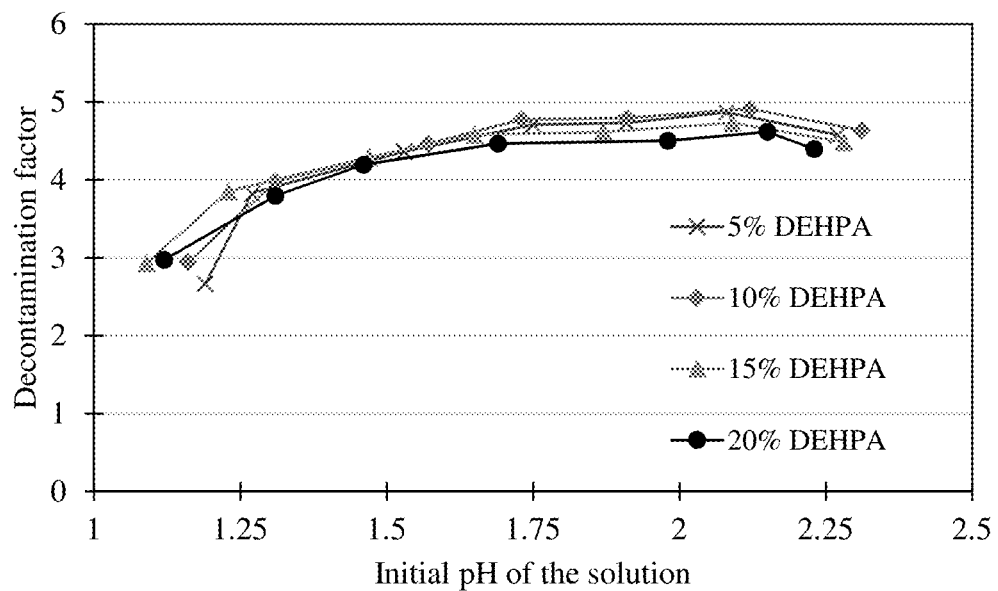
FIG. 14 is a graphical representation of the decontamination ratio as a function of pH and extraction concentration.

As shown in FIG. 14 the decontamination ratio is independent of the concentration of DEHPA in the organic phase. The contamination ratio increases 2.93 to 4.91 when the pH of the solution was increased from 1.1 to 2.0 and stays constant at higher pH. Therefore, it was concluded that the initial pH of 2.0 was most amenable to selective extraction of REEs from contaminants.

C. Aqueous to Organic Ratio in the Loading Step

Figure 15:
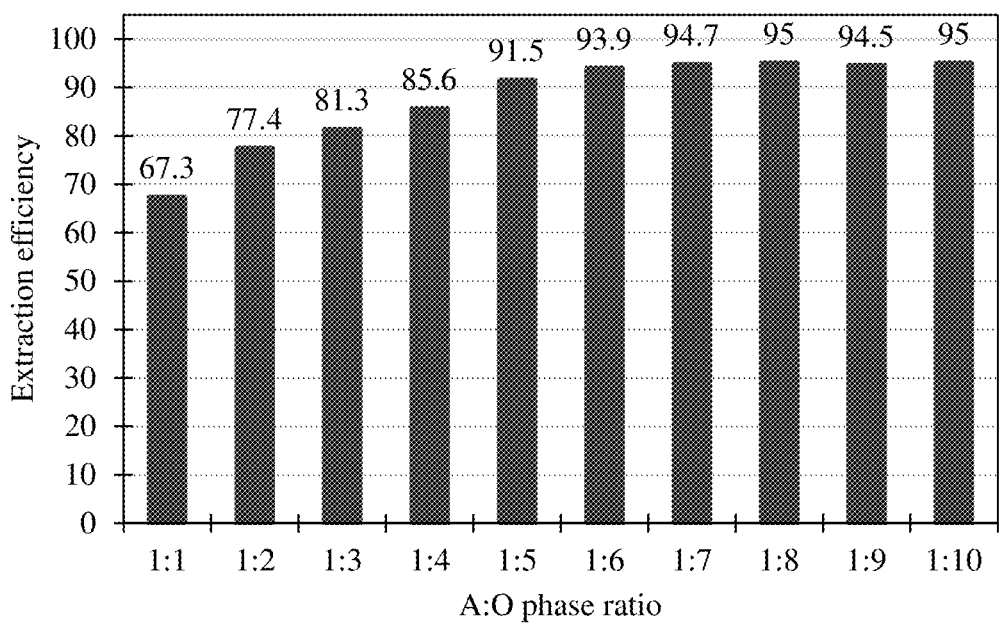
FIG. 15 is a graphical representation of the % loading with incremental aqueous to organic (A:O) ratio.

As ascertained in the optimization study for the initial pH and the extraction concentration, the optimum concentration of the extractant is 5% while the optimum pH is 2.0. However, the % extraction of lanthanum at those conditions is around 61%. To maximize the recovery of lanthanum from the test solution, different aqueous to organic or A:O ratios were tested. For this study, extraction tests were carried out at pH 2.0 with 5% DEHPA solution at different A:O ratios starting from 1:1 to 1:10. As is shown in FIG. 15, the recovery of the lanthanum increases to a maximum of 95% at A:O ratio of 1:6. The lanthanum recovery does not exhibit any increase at higher A:O ratios.

It is to be noted here is that the A:O ratio calculated here is calculated for a single batch mode of extraction. In a continuous counter current operation, the higher A:O would be implemented by employing appropriate number of stages and appropriate ratio of volumetric flow rates of organic and aqueous phases which would be calculated using process modelling.

D. Feed Pretreatment

An embodiment may include aqueous feed pretreatment for the reduction or precipitation of iron. The distribution coefficient of ferric ion is orders of magnitude higher than ferrous ion in DEHPA and other related extractants. This is due to the trivalent nature of the ferric species and the higher affinity of the cation exchange extractant for the trivalent species. As iron in ferric form was one of the major contaminants present in the leachate, the valence state of iron in the SX feed was pertinent for the separation efficiency of the process.

For efficient separation of REEs, the iron in the solution must be either precipitated using neutralizing agents like NaOH or lime, or reduced using a reducing agent, to its ferrous state. The precipitation of iron is undesirable in the current study due to co-precipitation of REEs with iron. Therefore, for the scope of this study, the iron was reduced to its ferrous state for enhancing the selectivity of the process and to prevent precipitation. The ORP (oxygen reduction potential) of the solution can be used as a measurable parameter to quantify the relative concentrations of $Fe^{3+}$ and $Fe^{2+}$. The ORP of the aqueous solution containing both ferrous and ferric solutions is given by:

$$E = \frac{2.303\ RT}{nF} \log_{10} \frac{Fe^{3+}}{Fe^{2+}} + \text{constant}$$

For this study ascorbic acid was used as the reducing agent for iron. Other suitable reductants can be utilized such as sulfur gasses, pyrite, copper or any such agent known to those skilled in the art. Ascorbic acid is a very strong reducing agent for iron. Its reducing mechanism is:

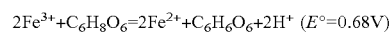
$2Fe^{3+} + C_6H_8O_6 = 2Fe^{2+} + C_6H_6O_6 + 2H^+$ ($E° = 0.68V$)

Ascorbic acid was utilized as the reducing agent because it is a very strong reducing agent and is required in very small volumetric quantities, therefore the ORP adjustment of the pregnant leach solution (PLS) does not result in significant dilution. The ascorbic acid solution for the optimization of ORP was prepared by dissolving 10 g of analytical grade ascorbic acid in 50 mL of DI water which corresponds to 200 g/L solution. The ORP of the solution was measured using a Thermofisher Orion probe using AgCl as the reference solution. The ORP of the test solution was adjusted by adding the ascorbic acid solution dropwise. For the optimization of the ORP values, 50 ml solutions of different ORP values was mixed with 50 mL organic solution containing 5% DEHPA in kerosene at an initial pH of 2.0. The solution was mixed by a VWR orbital shaker at 400 RPM for 15 minutes to ensure equilibrium. The organic and aqueous phase were separated using separatory funnel and the aqueous phase was analyzed using ICP-OES technique. The % extraction of the elements was calculated as described above. As the ORP of the solution dropped, the color of the solution changed from deep red to pale green indicating the reduction of the iron from ferric to ferrous ion.

Figure 16:
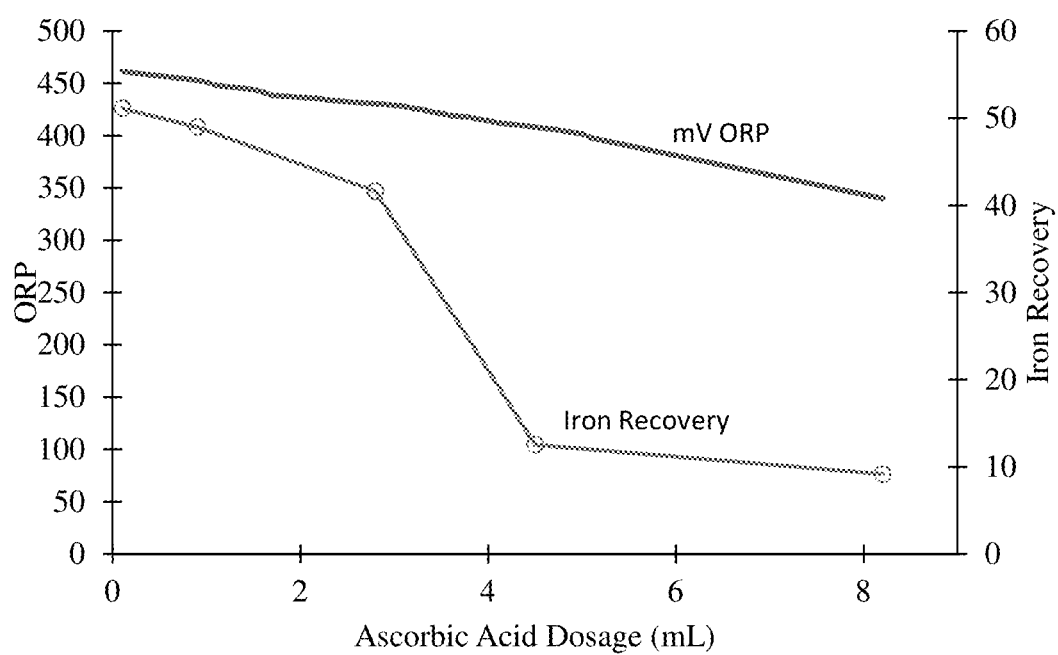
FIG. 16 is a graphical representation of the % iron extracted and the oxygen reduction potential (ORP) of the feed solution as a function of ascorbic acid dosage.

As shown in FIG. 15 the % extraction of iron reduces from 58% to less than 10% as measured as the percent extraction to the organic phase as the ORP is reduced from 460 to 300 mV. As an increasing amount of iron is reduced to its ferrous state, the extraction efficiency decreases before it stabilizes. As an example, FIG. 16 shows an ORP value of 400 mV was a good selection for rejection of iron. It was also noteworthy that the extraction efficiency of REEs and other contaminants is not affected by ORP manipulation. All the subsequent tests for parametric tests were carried out on test solution after adjusting the ORP of the solution to the optimum value of 400 mV.

E. Scandium Separation, Theory and Reduction to Practice

As the charge density of scandium is much higher than other REEs, it exhibits significantly different behavior than other REEs. Unlike REEs, scandium does not recover well in the aqueous phase during the stripping stage.

In at least one possible embodiment, the methodology for recovering the scandium from organic phase is saponification which is loading the organic phase with excess sodium releasing scandium in the aqueous phase. The organic phase must be modified to handle the saponification stage as without modification, the cation-exchange extractant forms an insoluble third phase. A phase modifier must be added in the organic extractant to prevent the third phase formation and facilitate the scandium recovery from organic phase. Due to the addition of the phase modifier, the extraction behavior of the REE was substantially altered. Two different phase modifiers, tributyl phosphate (TBP) and isodecanol were tested to determine their effect on the extraction curves of REEs as well as the contaminant elements.

In an embodiment to simplify the test work, 3 REEs (lanthanum, cerium and gadolinium) and three contaminants (aluminum, iron and calcium) were selected as representative for extraction shake out tests. Stock solutions of 100 mg/L for each element were prepared using analytical grade salts in dionized (DI) water. Three different organic extractant solutions were prepared for testing the effect of the phase modifier on the extraction characteristics, 5% DEHPA in kerosene (without any phase modifier), 5% DEHPA with 10% TBP in kerosene, and 5% DEHPA with 10% isodecanol.

Shake-out tests were carried out for each element by mixing 50 ml of aqueous solution with 50 ml of organic solvent for 15 minutes in an Erlenmeyer flask on a shaking table. The aqueous phase was disengaged from the organic phase using a separatory funnel and the elemental analysis was done using ICP-OES.

F. Results and Discussion

Figure 17:
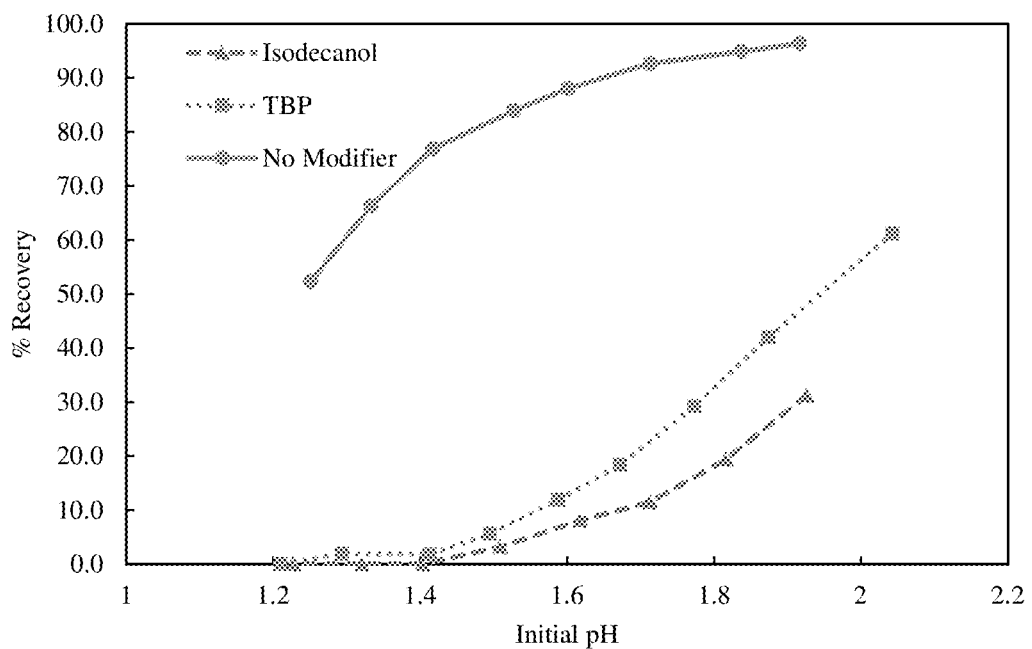
FIG. 17 is a graphical representation of the extraction curves of lanthanum with pH for 5% DEHPA in kerosene with and without the presence of tributyl phosphate (TBP) and isodecanol.
Figure 18:
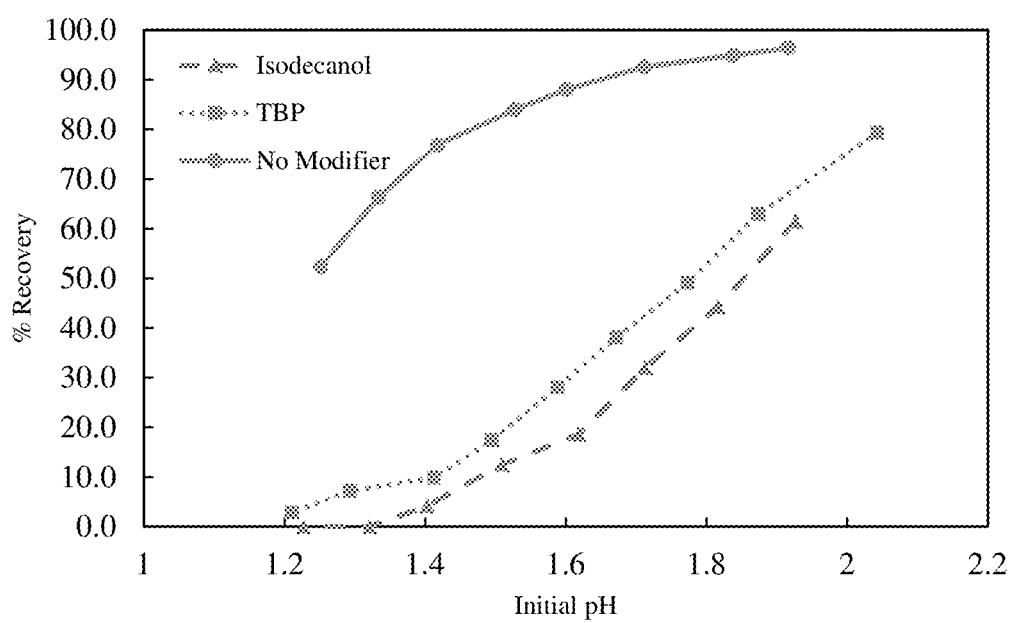
FIG. 18 is a graphical representation of the extraction curve of cerium with pH for 5% DEHPA in kerosene with and without the presence TBP and isodecanol.
Figure 19:
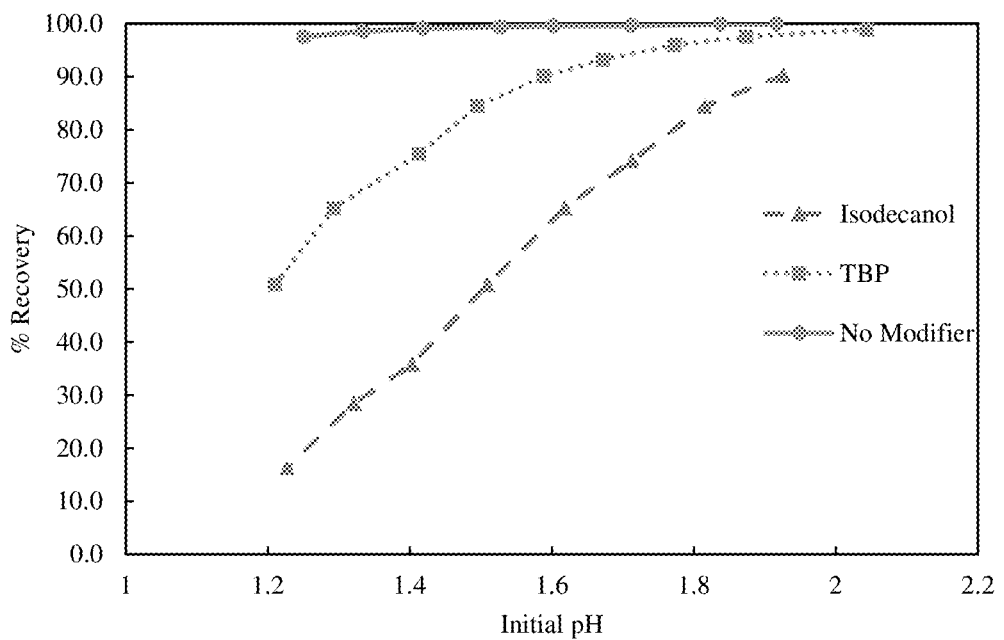
FIG. 19 is a graphical representation of the extraction curve of gandolinium with pH for 5% DEHPA in kerosene with and without the presence of TBP and isodecanol.

The extraction curve was generated by plotting the % extraction for individual metals as a function of pH. It was observed that for the REEs, there was a significant impact on the extraction curve of the two-phase modifiers tested. The addition of phase modifier shifted the extraction curve requiring a higher pH to extract the ions of interest. The effect of isodecanol on the extraction curve was stronger (higher pH extraction) as compared to TBP. FIGS. 17, 18 and 19 show the impact on extraction curves for lanthanum, cerium and gadolinium respectively.

The effect of phase modifiers on the extraction of contaminants was more distinct than that on REEs. The effect of phase modifiers on the contaminants in trivalent state, aluminum and iron had a similar trend to that on the REEs, it shifted to the right with the addition of the phase modifier.

Figure 20:
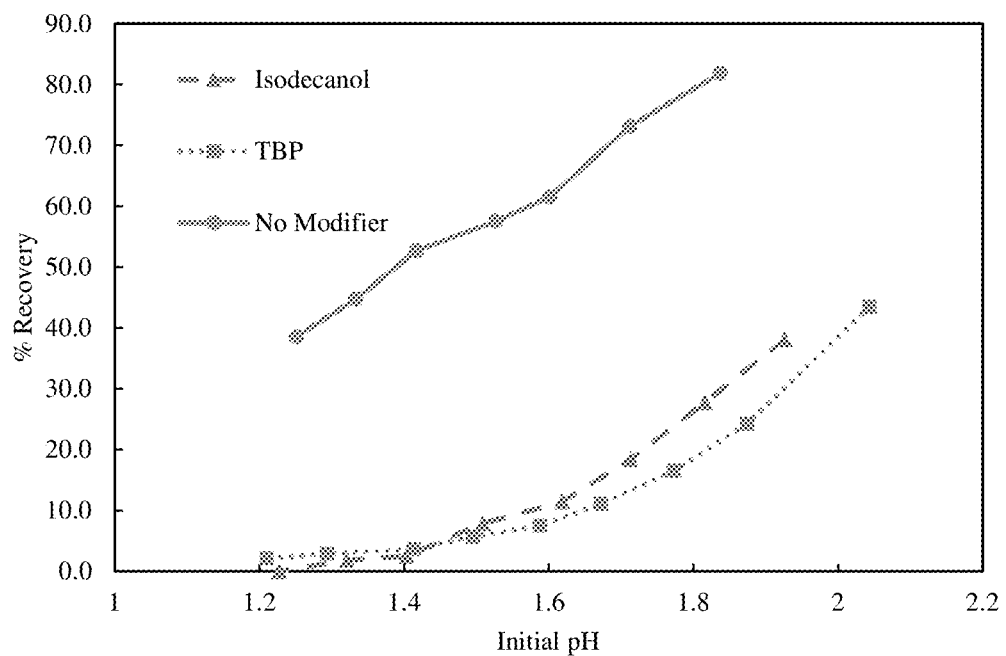
FIG. 20 is a graphical representation of the extraction curve of aluminum with pH for 5% DEHPA in kerosene with and without the presence of TBP and isodecanol.
Figure 21:
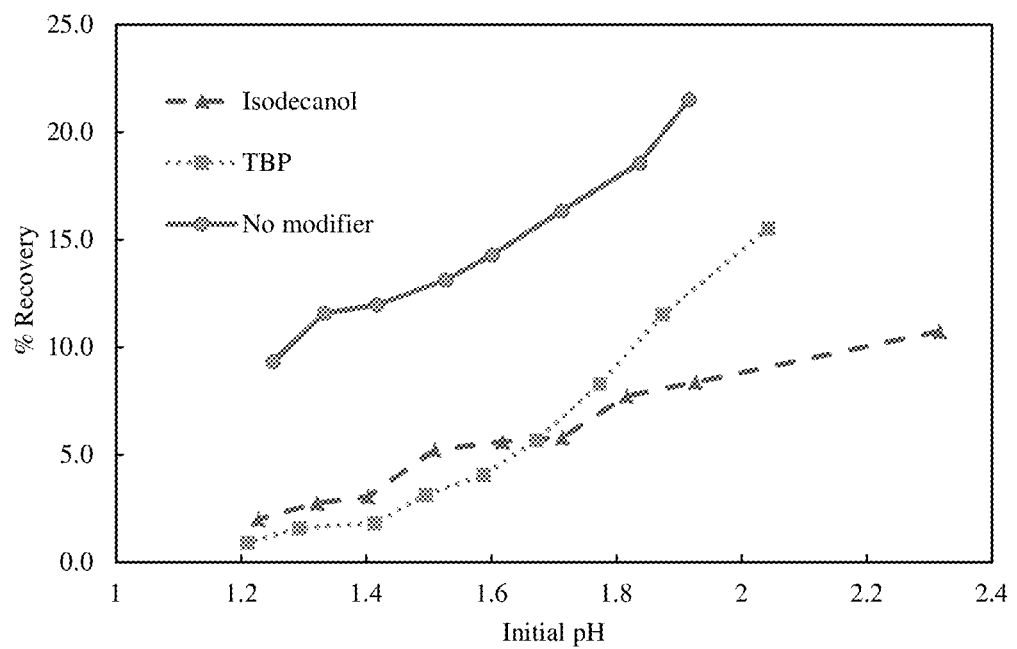
FIG. 21 is a graphical representation of the extraction curve of iron with pH for 5% DEHPA in kerosene with and without the presence of TBP and isodecanol.

The effect of the phase modifiers was more pronounced on aluminum as compared to that on iron. FIGS. 20 and 21 show the impact on extraction curves for aluminum and iron respectively.

Figure 22:
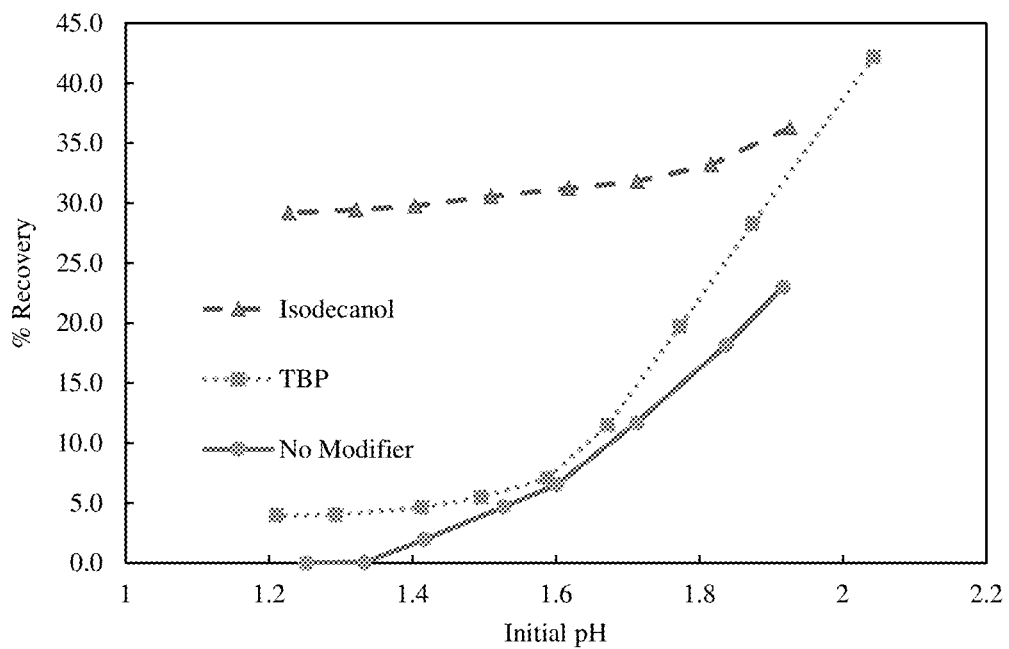
FIG. 22 is a graphical representation of the extraction curve of calcium with pH for 5% DEHPA in kerosene with and without the presence of TBP and isodecanol.

The effect on the calcium was significantly different than that on aluminum and iron. The addition of phase modifier shifted the extraction curves to the left. The % extraction for a pH was higher for the extractant with phase modifier than without it. While TBP had a small effect, isodecanol had a more pronounced effect on the extraction curve of calcium. FIG. 22 shows the impact on extraction curve for calcium.

G. Effect of Phase Modifiers on the Selectivity of Rare Earth Elements

In an embodiment, phase modifiers may be added to an extractant to produce beneficial separation characteristics. These effects can be seen in the differences between FIG. 23 and FIG. 24. These show the utilization of TBP vs non TPB on the extraction curves of various REEs.

To demonstrate the effect of increased selectivity between REEs the following selectivity factors were computed for each of the systems. Table 4 and Table 5 show the comparisons between the two systems in order of extraction for the conditions of maximum separation. This shows that the synergistic effect of TBP generally enhances the separation factor. This effect can be significant to reduce costs and the number of extractant stages needed to recover REEs.

The shake out tests were carried out in wide mouthed Erlenmeyer flasks on a VWR digital orbital shaker at 400 RPM for 15 minutes to ensure the reaction reached equilibrium. The loaded organic solution was stripped using incremental concentrations of $H_2SO_4$ solution from 1M to 5M to recover the metals back in the aqueous phase. The A:O ratio for each of the shake out tests was kept at 1:1 to ensure consistent results.

Figure 25:
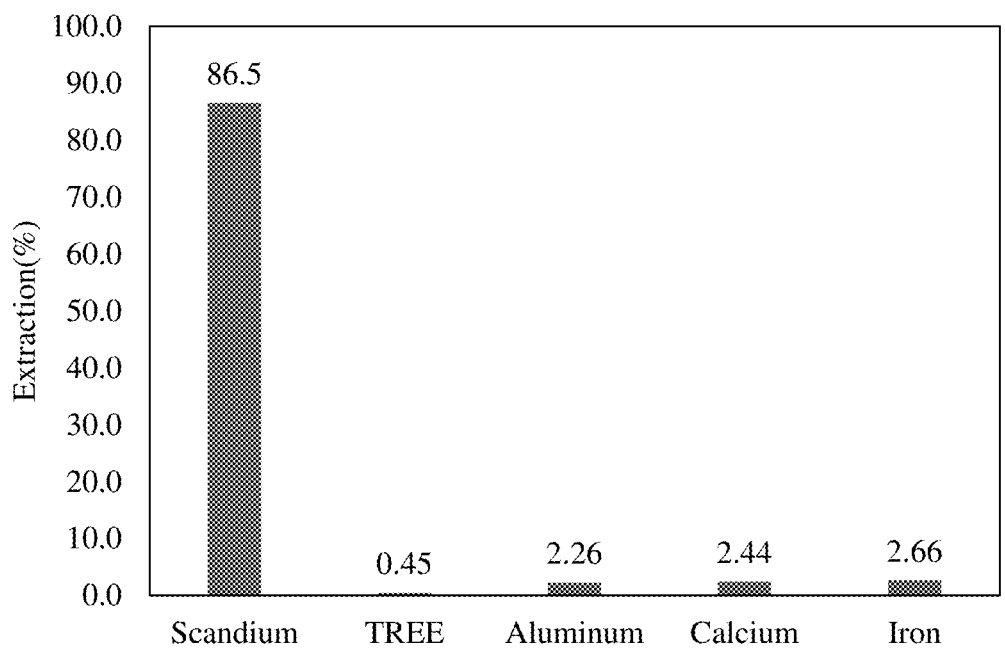
FIG. 25 is a graphical representation showing extraction of different elements from 5% Cyanex 272 in kerosene from PLS generated Dotiki coarse refuse.

As the concentration of scandium in the feed solution was very low (0.663 ppm), fresh feed solution was contacted with the organic solution 8 times to build up the concentration so that the final concentration was high enough to be measured by ICP-OES. As shown in FIG. 25, the % extraction of scandium was around 87% while the % extraction for the rest of the REEs along with the major contaminants was very small, indicating a very high selectivity of the extractant. The calculated % extraction of scandium was limited by the low concentration of scandium in the feed as the concentration of scandium in raffinate was ~60 ppb which was below the detection limit of ICP analytical method.

Figure 26:
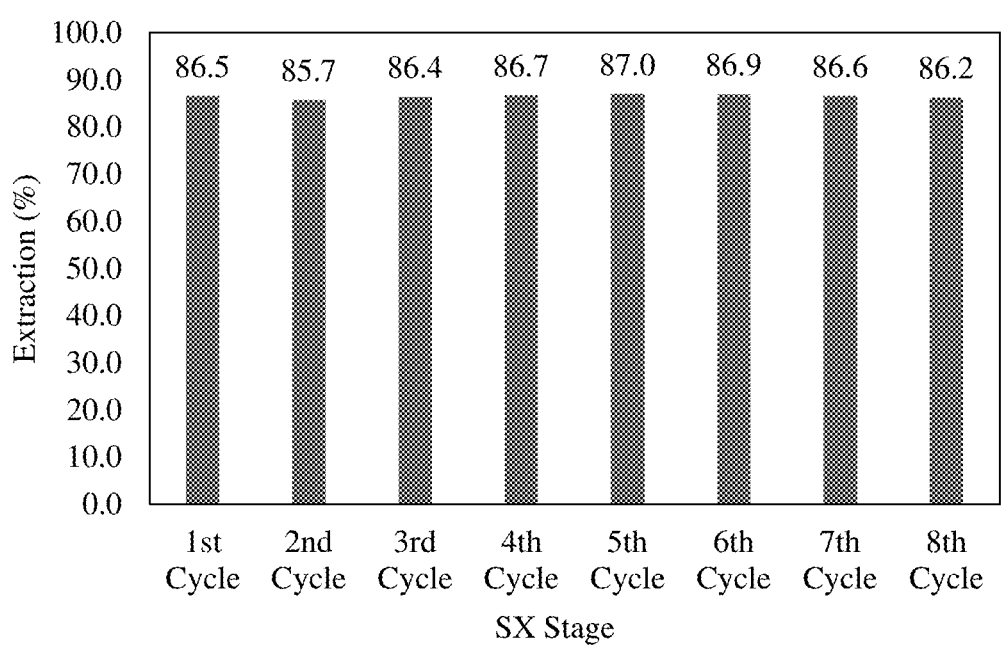
FIG. 26 is a graphical representation of the % extraction of scandium in each cycle of loading using 5% Cyanex 272 from PLS generated Dotiki coarse refuse.

The % extraction scandium was constant for each individual round of extraction, indicating that the organic was not completely loaded even after 8 times of loading, as shown in FIG. 26. This result was expected due to the extremely low concentration of scandium in the feed solu-

TABLE 4

Figure 23:
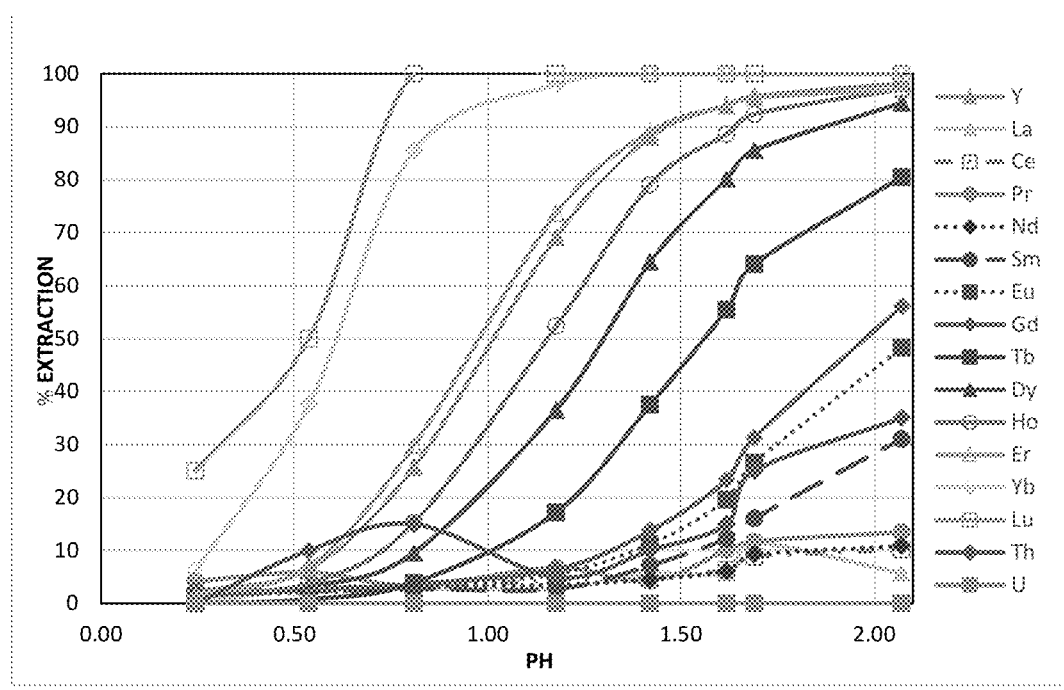
FIG. 23 is a graphical representation of the extraction curve showing DEHPA-TBP extractant mix.

Separation factors for a Depha-TBP mixture in order of extraction from FIG. 23.

| Lu/Yb | Yb/Er | Er/Y | Y/Ho | Ho/Dy | Dy/Tb | Tb/Gd | Gd/Th | Th/Sm | Sm/Pr | Pr/Nd | Nd/Ce | Ce/La |
|---|---|---|---|---|---|---|---|---|---|---|---|---|
| 5 | 16.8 | 1.2 | 2.1 | 2.1 | 4.3 | 4.1 | 1.7 | 6.2 | 1.8 | 2.8 | 1.3 | 1.6 |

TABLE 5

Figure 24:
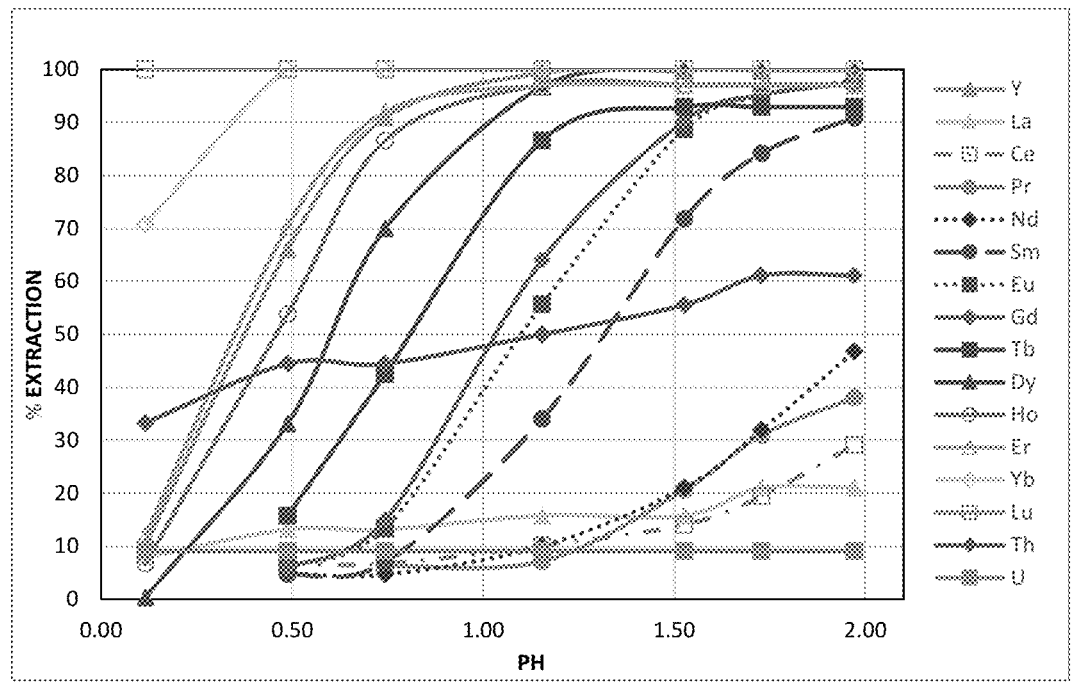
FIG. 24 is a graphical representation of extraction curves showing 2% DEHPA as extractant.

Separation factors for a 2% Depha mixture in order of extraction from FIG. 24.

| Lu/Yb | Yb/Er | Er/Y | Y/Ho | Ho/Dy | Dy/Tb | Tb/Gd | Gd/Eu | Eu/Sm | Sm/La | La/Nd | Nd/Pr | Pr/Ce |
|---|---|---|---|---|---|---|---|---|---|---|---|---|
| 1.4 | 5.9 | 1.2 | 1.5 | 20.7 | 2.1 | 2.9 | 1.1 | 1.9 | 4.5 | 2.8 | 1.4 | 1.6 |

H. Selective Scandium Removal

In an embodiment scandium may be removed as an element prior to the extraction of other REEs. Evidence includes the following study. The feedstock solution for this study was a PLS generated from heap leaching of coarse refuse of Western Kentucky #13 seam collected from Dotiki. The elemental composition of the solution was analyzed using ICP-OES. It was shown that the solution contained 9.2 ppm of total REEs along with 0.663 ppm of scandium. The solution also contained a large concentration of iron, aluminum and calcium as contaminants with concentrations of 3600 ppm, 1200 ppm and 300 ppm respectively. The iron in the PLS predominantly was present as a ferric species, which tends to interfere with the extraction of scandium by the extractant. Therefore, the iron was reduced to its ferrous valence state using ascorbic acid as a reducing agent.

The organic phase for this study was 5% v/v Cyanex 272 in kerosene. The extractant Cyanex 272 was procured from Solvay for testing purposes. The analytical grade kerosene was procured from Fisher-Scientific. The acid and base solution used for pH adjustment were of trace metal analytical grade and were procured from Fisher-Scientific.

tion coupled with high selectivity of the extractant, it can be contacted at a very high ratio before it reaches full capacity.

Figure 27:
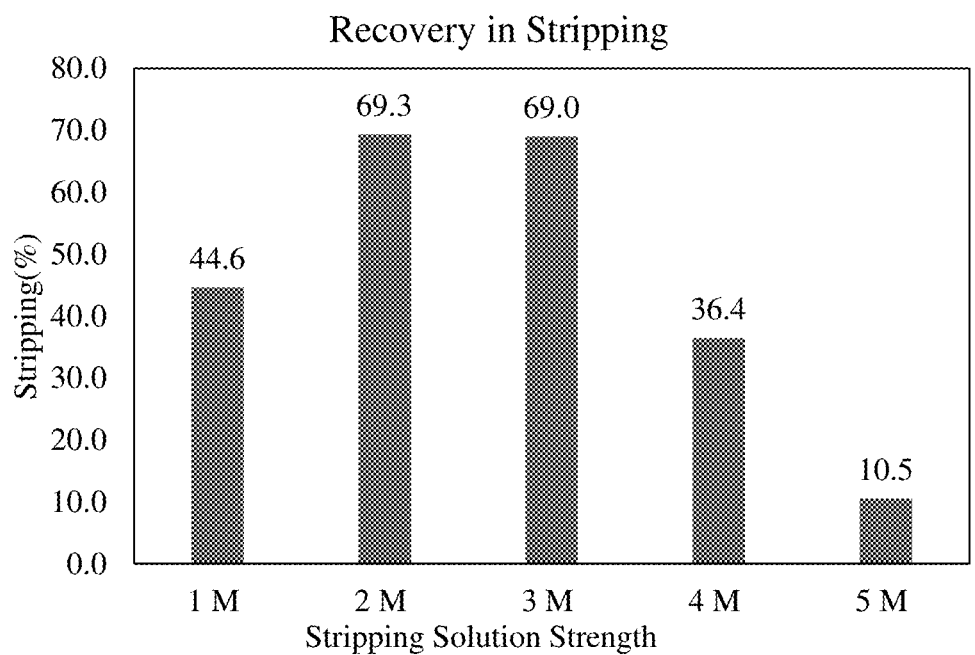
FIG. 27 is a graphical representation of % stripping of scandium from different concentrations of $H_2SO_4$ as stripping solution.

For the stripping test, the loaded organic was contacted with 1-5 M $H_2SO_4$ solution in the increments of 1 M. As shown in FIG. 27, the 2M $H_2SO_4$ gave the highest stripping efficiency of 69.3%.

Figure 28:
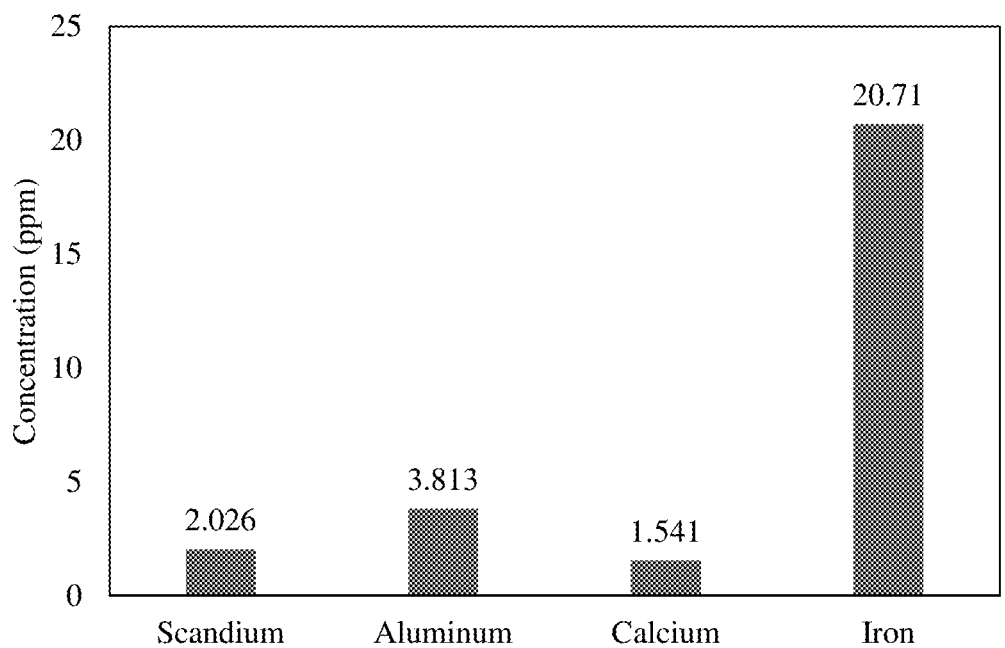
FIG. 28 is a graphical representation of the elemental composition of the stripped solution produced from 5% Cyanex 272 loaded after contacting the PLS generated Dotiki coarse refuse eight times.

Due to the extremely high selectivity of the extractant, the stripped solution reported a significantly concentrated solution of scandium when compared to the feed. The ratio Sc/REE increased from 0.0765 in the feed to 59.588 in the stripped solution and the ratio Sc/(Fe+Al+Ca) increased from $1.2 \times 10^{-4}$ in the feed to $7.7 \times 10^{-2}$ in the stripped solution. The composition of the stripped solution is shown in FIG. 28.

This indicated that the process can be used effectively to preconcentrate the scandium from the solution without co-extracting significant quantity of REEs or contaminant. However, due to the very high concentration of the contaminants in the feed solution, the stripped solution contains an amount of contaminants, which requires a second stage of extraction using Cyanex 272 to work as a cleaner circuit to reject the rest of the contaminants before scandium can be precipitated as oxalates.

I. Alternate Embodiments

Figure 29:
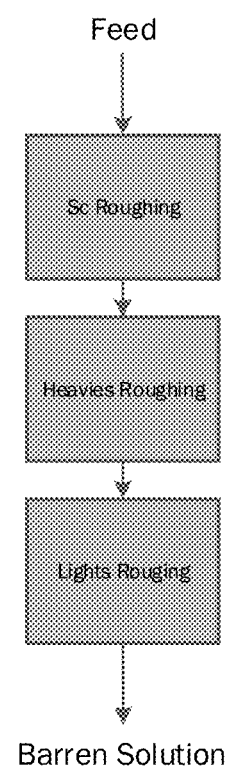
FIG. 29 is a schematic diagram illustrating selective loading utilizing various roughers based on extractant and/or phase modifier manipulation.

In view of the previous described embodiments those skilled in the art would be able to create a process where the utilization of various extractant concentrations in the dilutant combined with utilization of phase modifiers will allow the sequential separations of various groups of REEs. Such an embodiment is shown in FIG. 29.

Those skilled in the art will also be able to utilize pH to selectively remove REEs from loaded organic solutions.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of recovering rare earth elements from an aqueous coal source leachate, comprising:
    contacting, in a roughing circuit, rare earth elements in the aqueous coal source leachate with the organic phase to extract the rare earth elements into an organic phase and leave contaminants in an aqueous phase;
    scrubbing, in the roughing circuit, additional contaminants from the organic phase;
    stripping, in the roughing circuit, the rare earth elements from the organic phase; and
    recovering the rare earth elements in a rare earth element containing solution.

2. The method of claim 1, including using an organic extractant in the organic phase to provide preferential extraction of the rare earth elements from the aqueous coal source leachate.

3. The method of claim 2, including completing the contacting at an operating pH of between 0.5 and 3.5.

4. The method of claim 1, including using a first acid to selectively scrub the additional contaminants from the organic phase at a first pH.

5. The method of claim 4, including using a second acid to strip the rare earth elements from the organic phase at a second pH wherein said second pH<said first pH.

6. The method of claim 1, including cleaning the rare earth elements in the rare earth element containing solution to upgrade purity of the rare earth elements.

7. The method of claim 6, wherein said cleaning includes subjecting the rare earth elements in the rare earth element containing solution to additional contacting, scrubbing and stripping steps with an organic phase in a cleaning circuit separate from the roughing circuit.

8. The method of claim 7, including maximizing contaminant rejection and recycling unextracted rare earth elements back to a leaching circuit upstream of the roughing circuit or a feed of the roughing circuit.

9. The method of claim 8, including subjecting a stripped solution from the cleaning circuit to oxalate precipitation after pH adjustment to a predetermined pH.

10. The method of claim 6, wherein said cleaning includes incrementally raising the pH of an aqueous solution in which the rare earth elements are held whereby different groups of contaminants are precipitated in different pH ranges.

11. The method of claim 10, wherein said cleaning is performed in a selective precipitation circuit separate from the roughing circuit.

12. The method of claim 11, including re-dissolving rare earth element hydroxides and precipitating as oxalates by adding calculated amounts of oxalic acid at a predetermined pH.

13. The method of claim 6, including subjecting recovered rare earth elements to oxalic precipitation by first bringing the pH of the rare earth element containing solution to a predetermined pH and then adding a calculated amount of oxalic acid to precipitate the rare earth elements preferentially.

14. The method of claim 1, including, following stripping, recovering scandium from the organic phase by saponification in a saponification circuit separate from the roughing circuit.

15. The method of claim 14, including treating the organic phase with an alkali solution causing the scandium to precipitate as scandium hydroxide and then filtering the scandium hydroxide from an aqueous solution.

16. The method of claim 15, including recycling the organic phase from the saponification circuit back to the roughing circuit.

17. The method of claim 16, further including treating the organic phase with a third acid to remove additional contaminants prior to treating the organic phase with an alkali solution.

18. The method of claim 17, further including treating the aqueous solution with a fourth acid to exchange a saponification ion with $H^+$ prior to recycling back to the roughing circuit.

19. The method of claim 1, including maintaining an aqueous to organic ratio in the roughing circuit of 1:1 to 1:100 at a pH of 0.5 to 3.5 and a concentration of organic extractant of between 0.5% and 10%.

20. The method of claim 14, including adding a phase modifier to the organic phase to assist in saponification and improve selective recovery of said rare earth elements.

21. The method of claim 1 including pretreating an aqueous feed with a reducing agent to the roughing circuit for reduction of ferric iron to ferrous iron to decrease contamination.

22. The method of claim 21, including using the reducing agent selected from a group consisting of sulfur gasses, pyrite, copper, ascorbic acid, metallic iron and combinations thereof.

* * * * *

UNITED STATES PATENT AND TRADEMARK OFFICE
CERTIFICATE OF CORRECTION

PATENT NO. : 11,186,895 B2  
APPLICATION NO. : 16/534738  
DATED : November 30, 2021  
INVENTOR(S) : Werner et al.

Page 1 of 1

It is certified that error appears in the above-identified patent and that said Letters Patent is hereby corrected as shown below:

In the Claims

Claim 1, Column 19, Line 23, replace "the organic phase" with "an organic phase"

Claim 1, Column 19, Line 24, replace "an organic phase" with "the organic phase"

Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*